March 10, 1959  H. P. HASELL ET AL  2,876,900
AUTOMATIC MOUNT MAKING MACHINE FOR PROJECTOR LAMPS AND LEAD
WIRE DETECTOR AND LEAD WIRE REMOVAL DEVICE THEREFOR
Filed Dec. 11, 1953  12 Sheets-Sheet 4
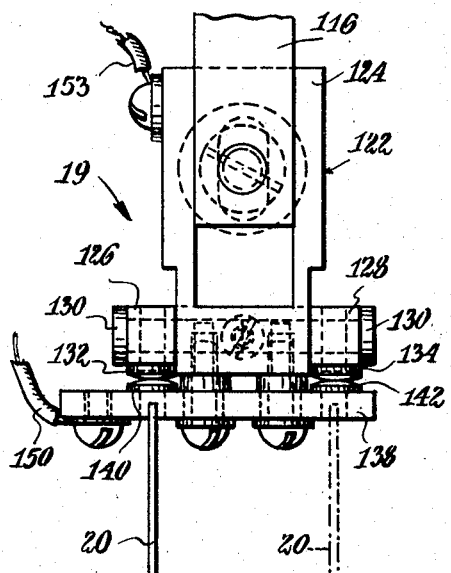
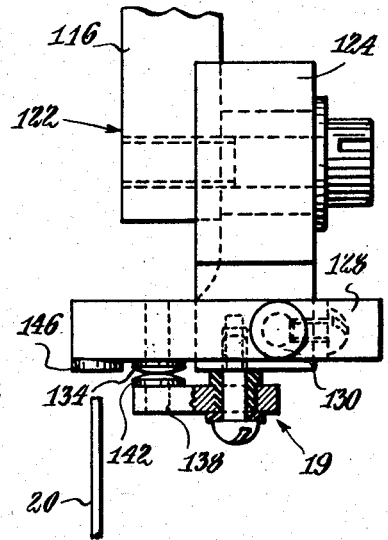
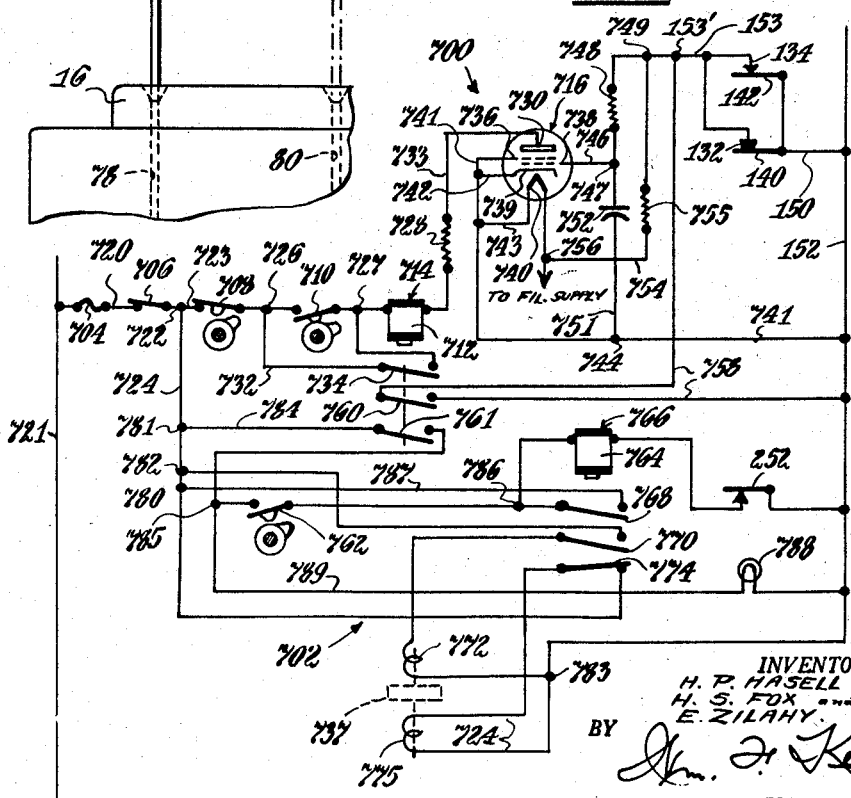
INVENTORS.
H. P. HASELL,
H. S. FOX and
E. ZILAHY.
BY
ATTORNEY.

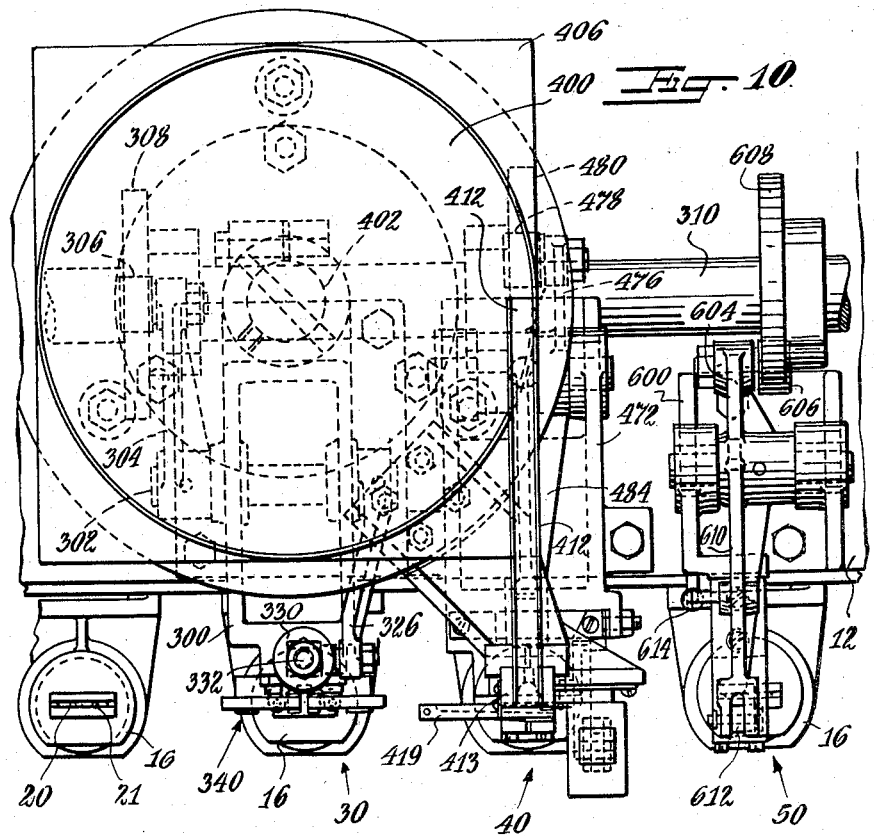
Fig. 10
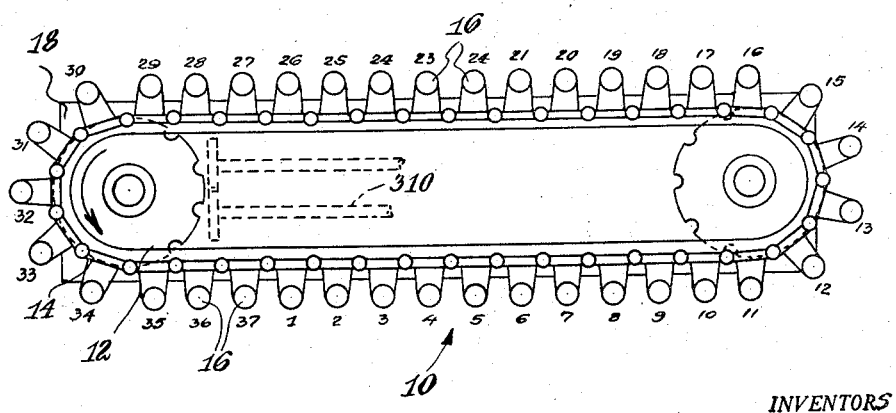
Fig. 1.
INVENTORS
H. P. HASELL,
H. S. FOX and
E. ZILAHY.
BY
ATTORNEY.

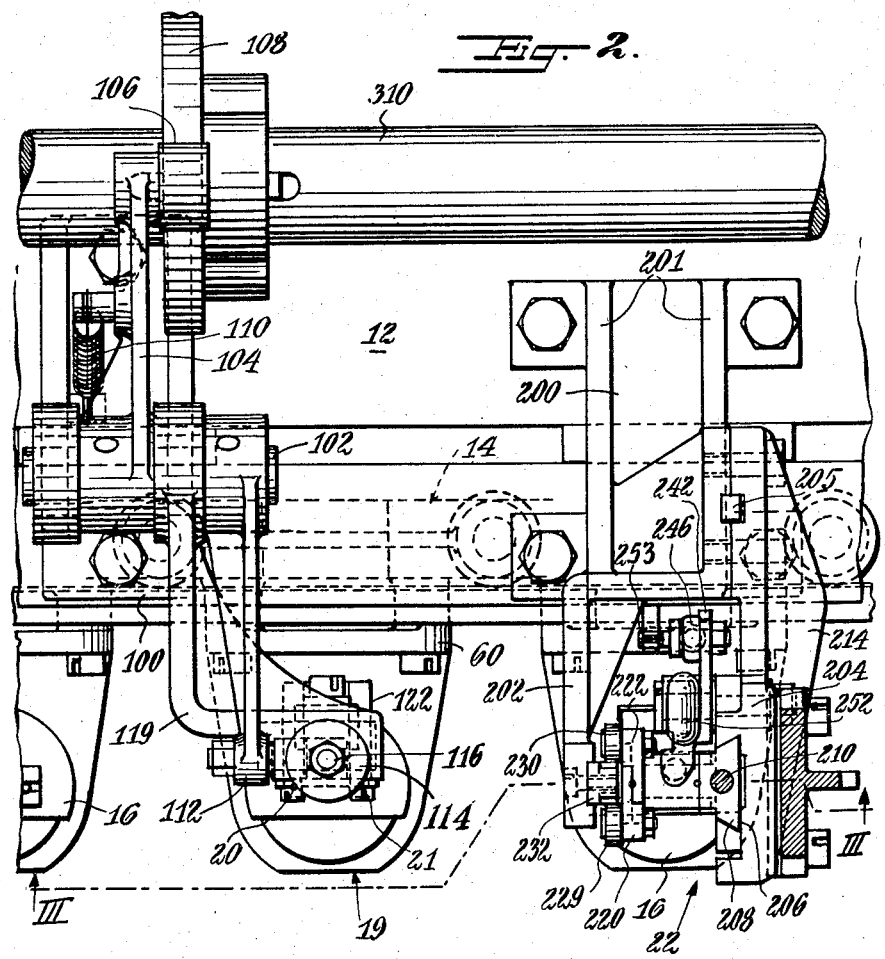
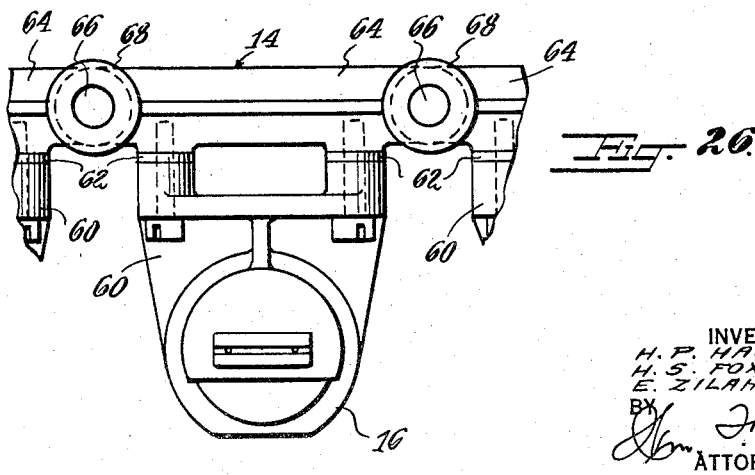

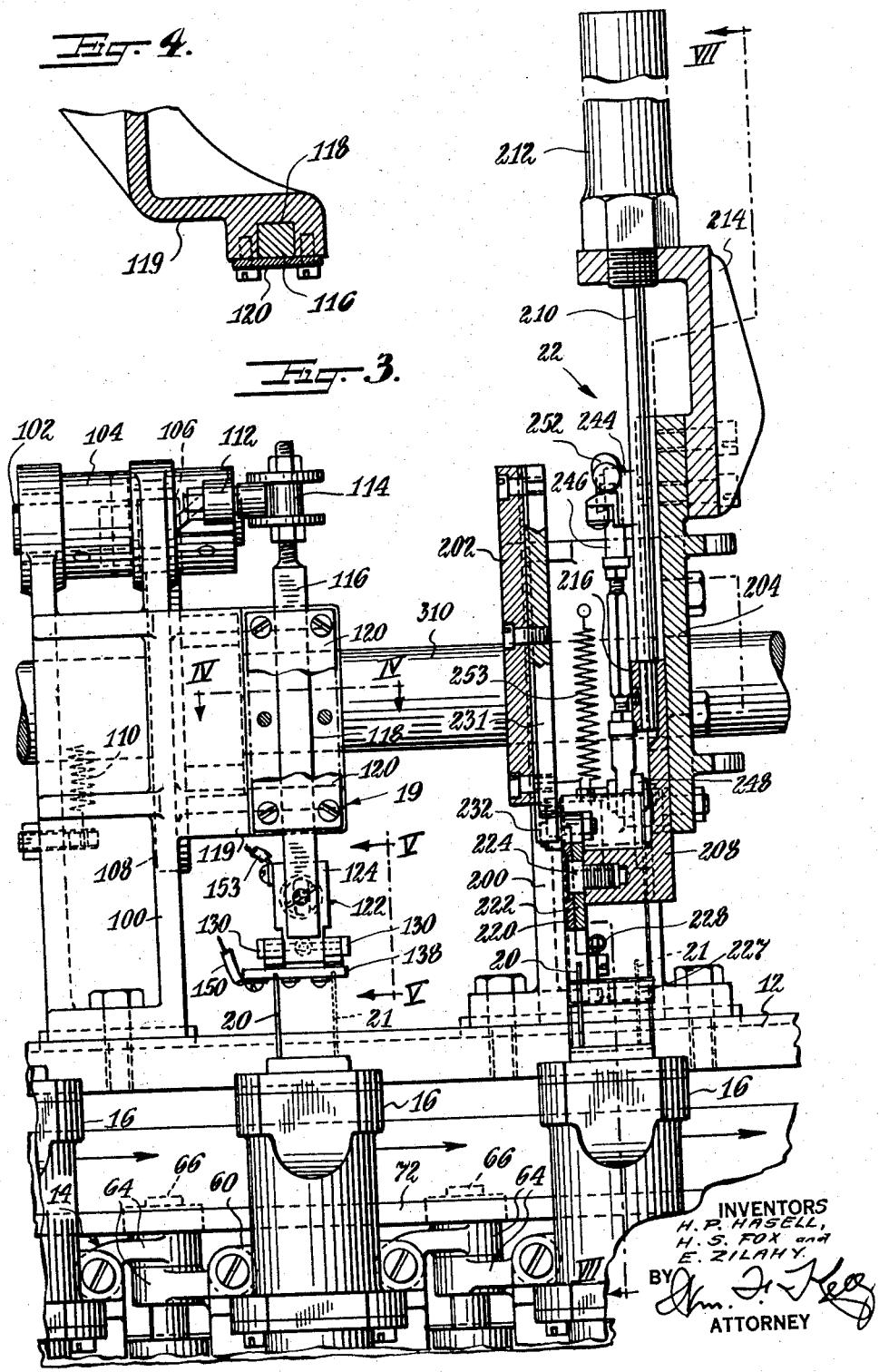

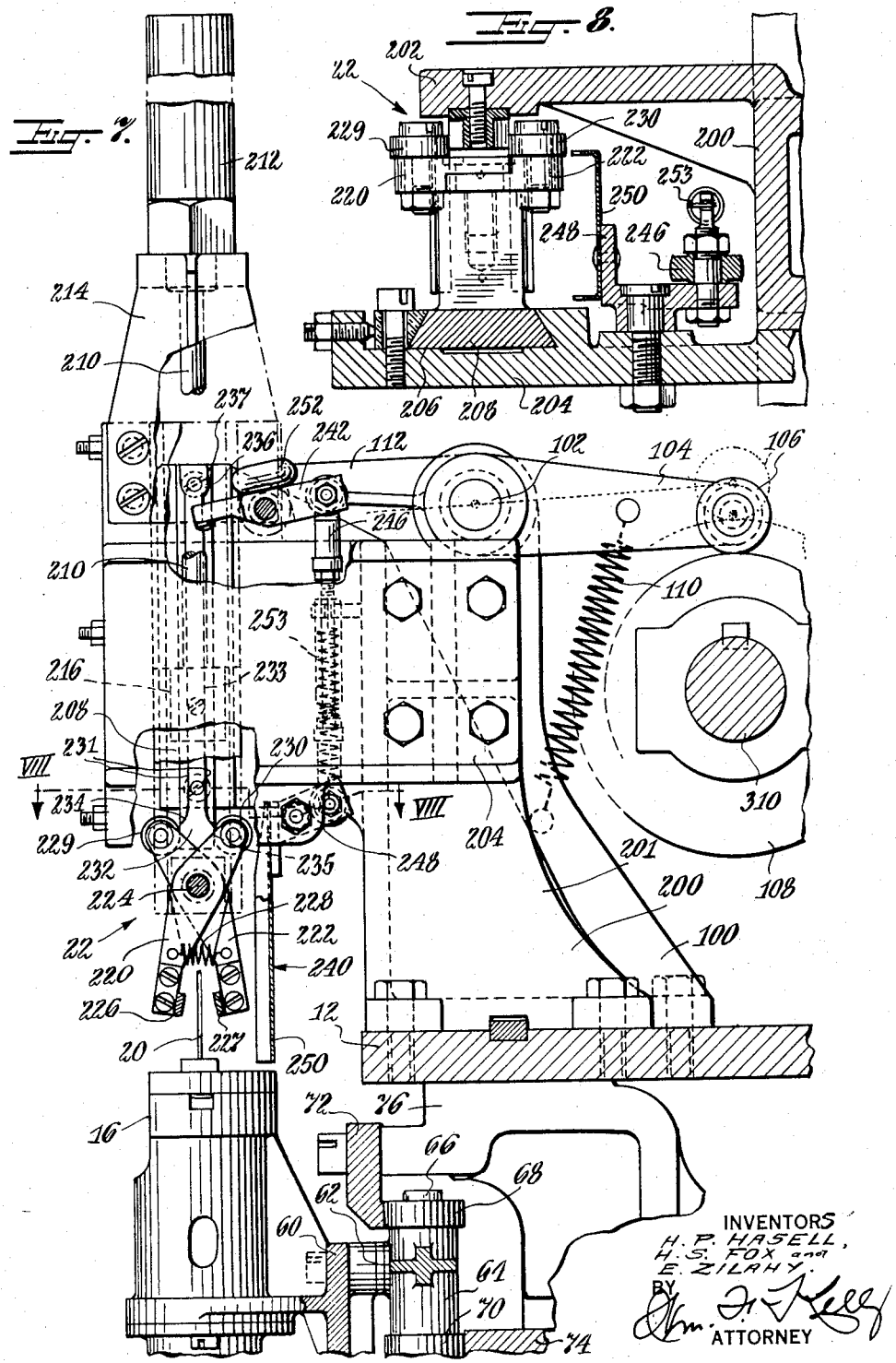

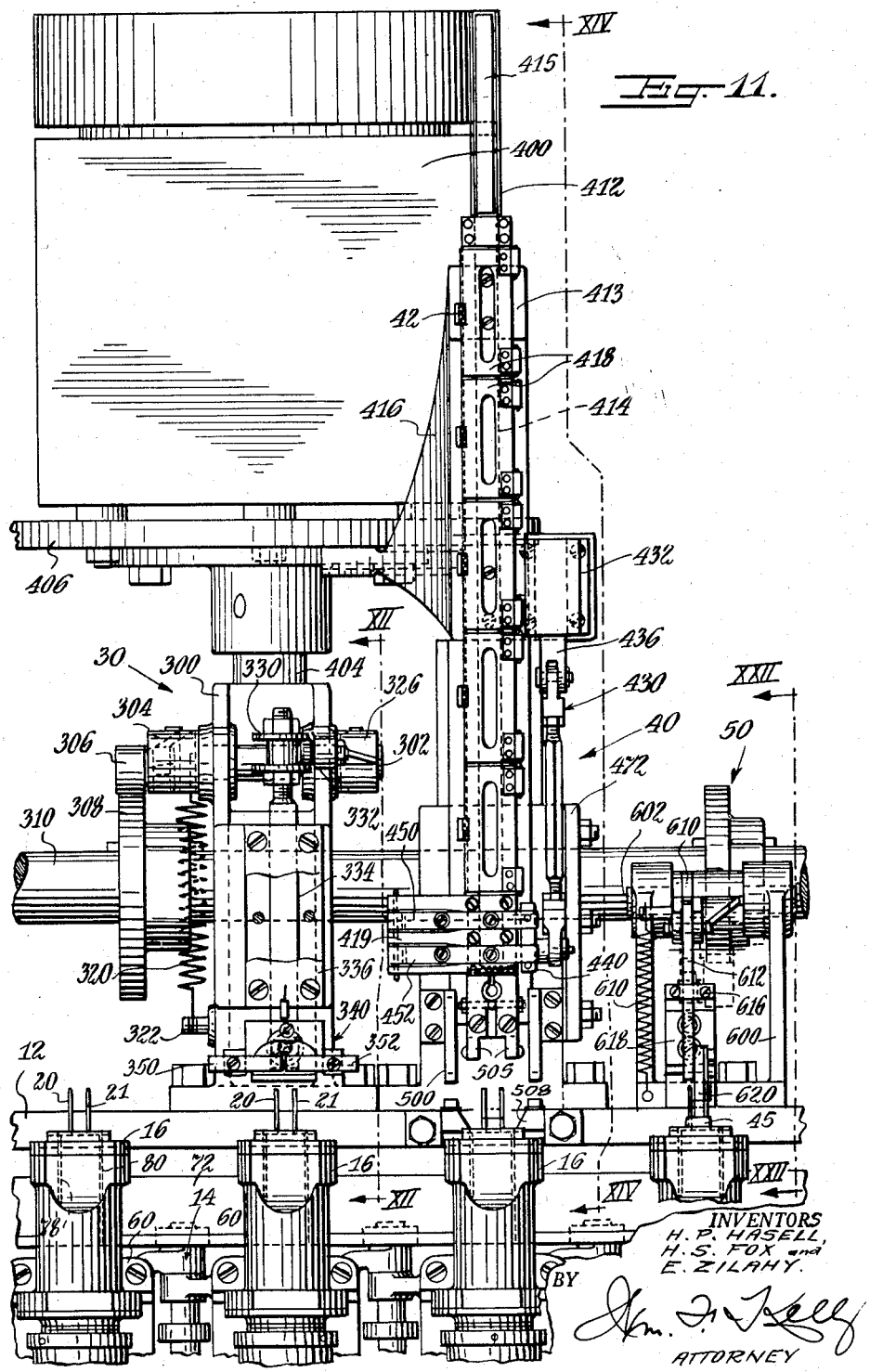

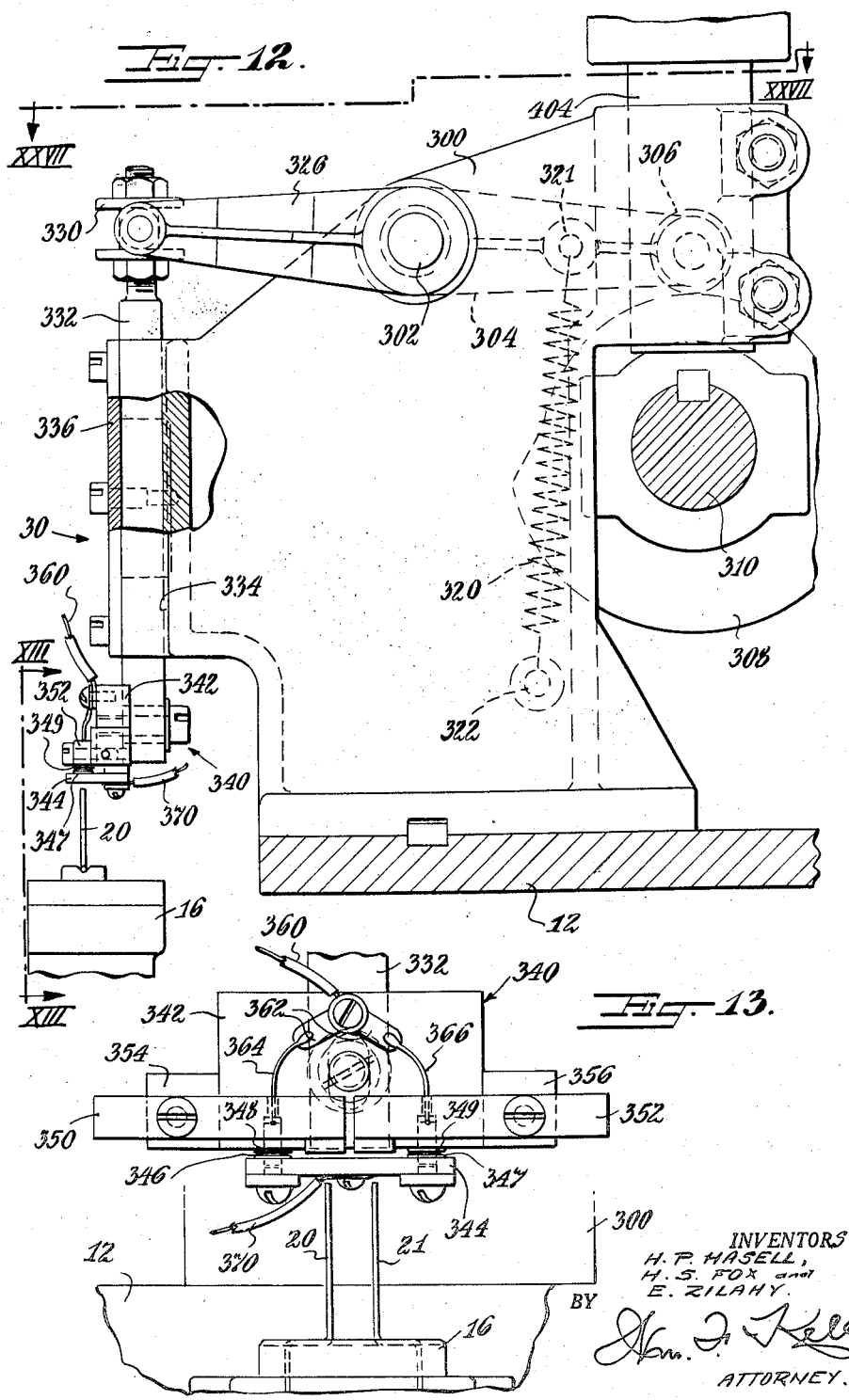

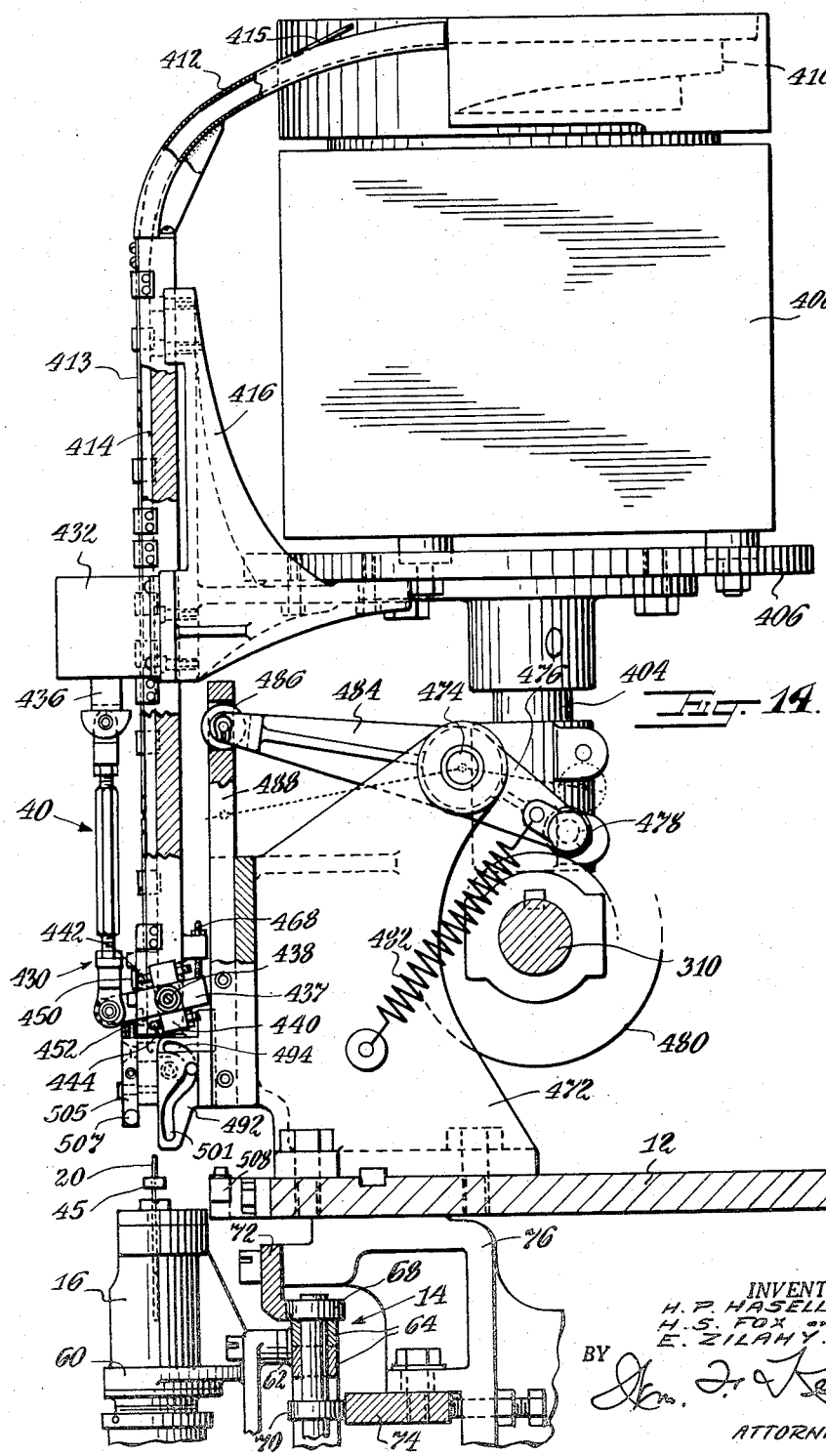

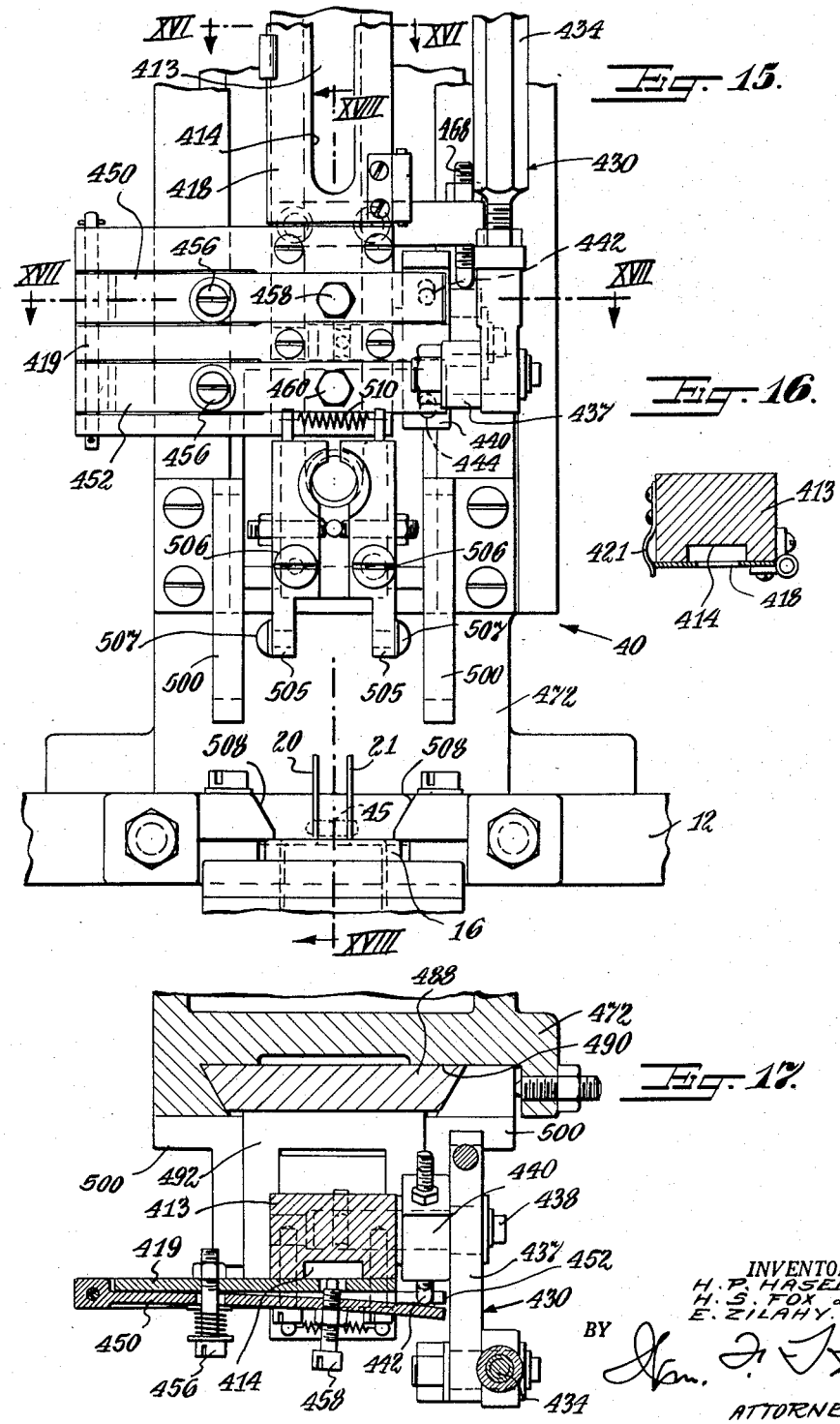

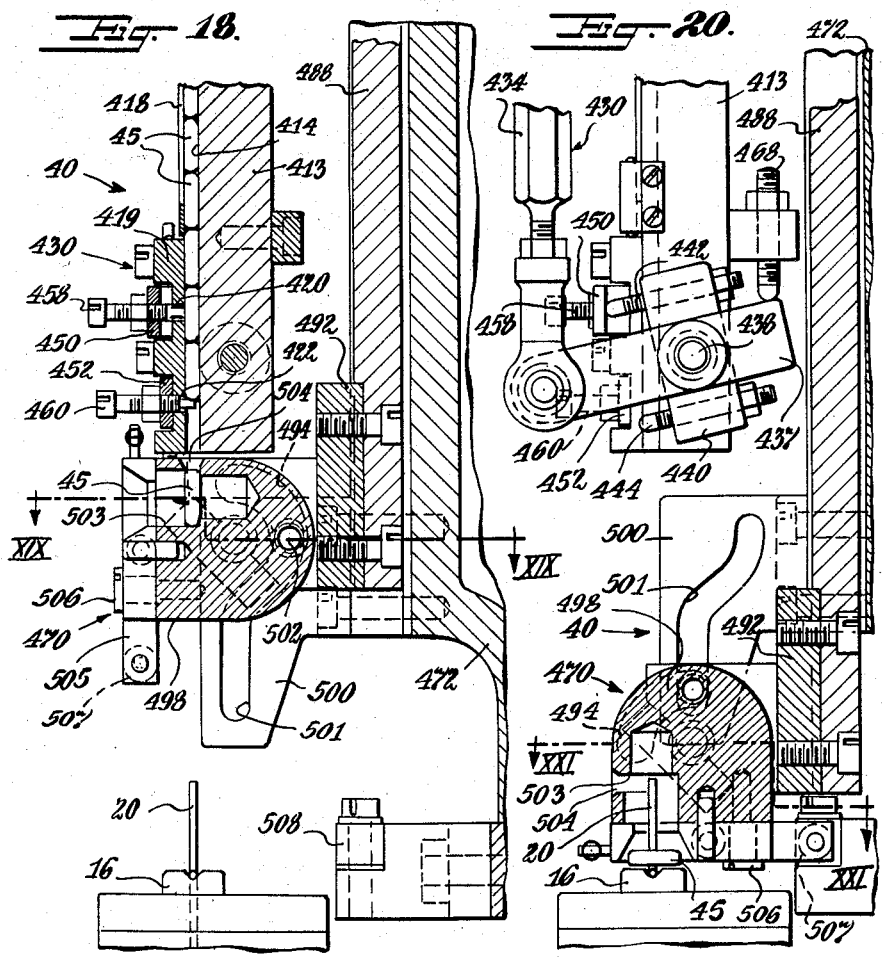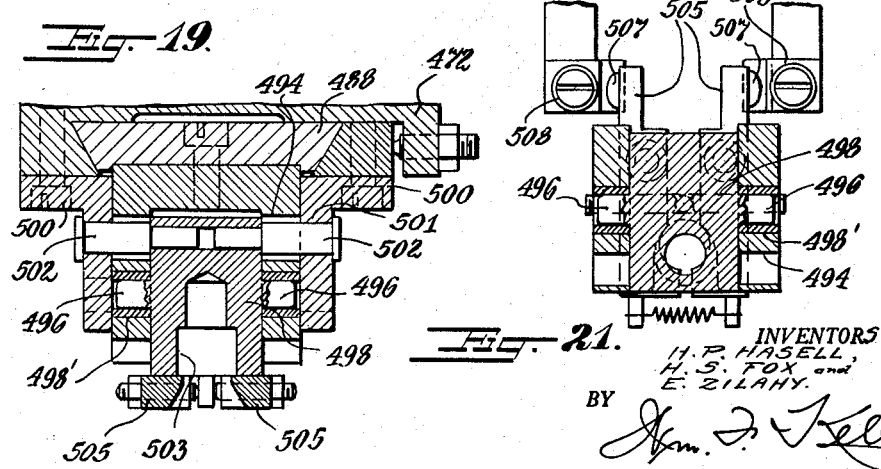

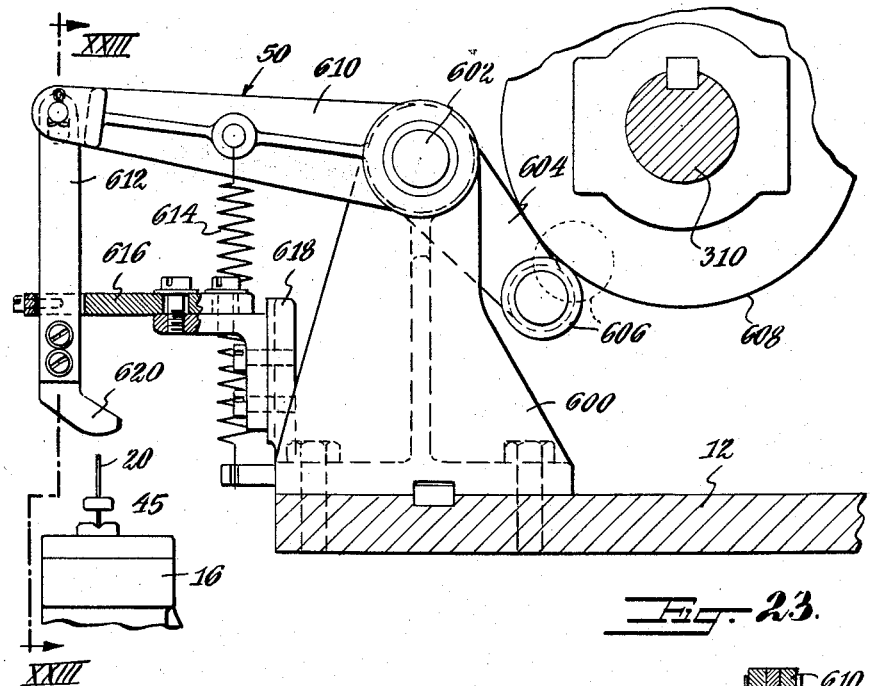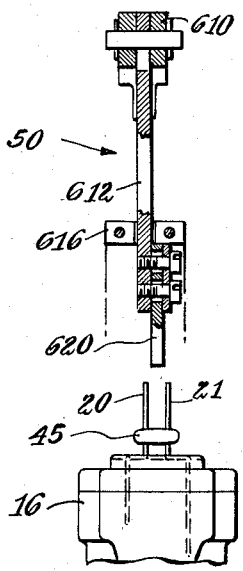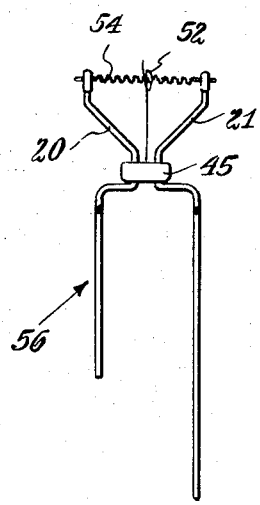

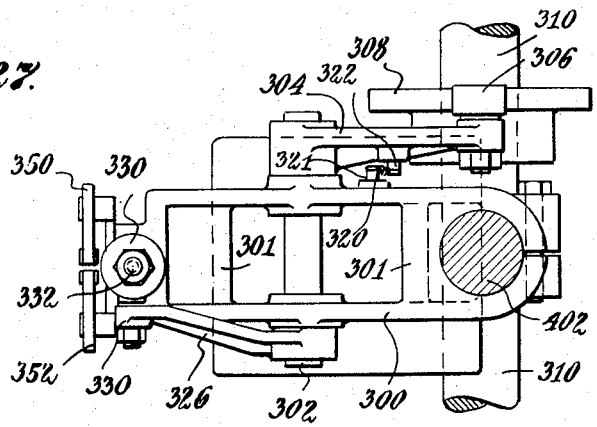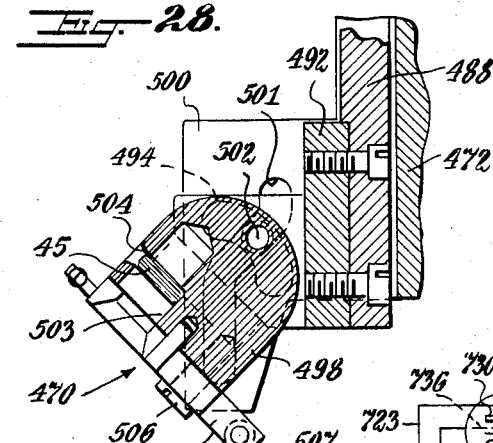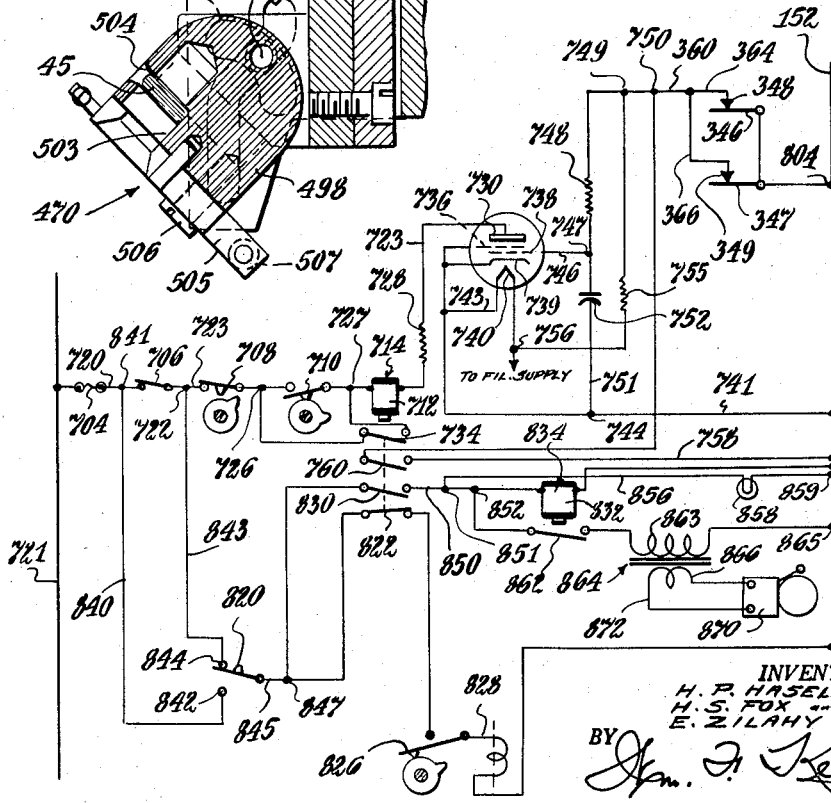

United States Patent Office 2,876,900
Patented Mar. 10, 1959

2,876,900

AUTOMATIC MOUNT MAKING MACHINE FOR PROJECTOR LAMPS AND LEAD WIRE DETECTOR AND LEAD WIRE REMOVAL DEVICE THEREFOR

Henry P. Hasell, Bloomfield, N. J., Herbert S. Fox, Plover, Wis., and Edward Zilahy, Nutley, N. J., assignors to Westinghouse Electric Corporation, East Pittsburgh, Pa., a corporation of Pennsylvania Application December 11, 1953, Serial No. 397,635

13 Claims. (Cl. 209—72)

The present invention relates to the manufacture of sealed beam projector lamps and, more particularly, to an automatic mount making machine therefor.

Sealed beam projector lamps combine in one unit a light source and a highly efficient sealed-in reflector consisting of vaporized aluminum or silver applied to the inner surface of the bulb. The contour of the bulb wall is such as to produce a concentrated beam of light, the final beam pattern being determined by the type of lens used in the projector lamp.

The projector lamp may comprise essentially a reflector envelope provided with ferrule hubs or bosses to which are sealed mount supporting ferrules. The filament mount for a reflector type lamp has a bead type stem provided with a button or bead for integrating a pair of formed leading-in and supporting conductors, a straight coiled coil filamentary electrode secured to the conductors and a center support member projecting from said bead and around the center portion of said filamentary electrode.

The bottom portion of each of the leading-in conductors of the prefabricated mount assembly is threaded through a lead wire guide protuberance or cup on the bottom of the ferrule and is then soldered thereto. A lens is then sealed to the open portion of the reflector lamp and the lamp is exhausted through a vitreous exhaust tubulation suitably disposed between the ferrules of the reflector envelope. After tip-off on the exhaust machine a skirt type base is secured about the ferrules with a suitable cement and the projecting portions of the leading-in and supporting conductors are soldered to the base, one conductor to the shell and the other conductor to the center contact thereof.

In the past a plurality of operators, for example 9, have been employed in the assembly line for fabricating, by hand, the mount for such a reflector lamp. Hence, it has been found advantageous, according to our invention, to provide an automatic conveyor type machine provided with a cam and roller indexing mechanism and having, except for the filament feeding operation, automatic feeding devices throughout.

The machine of our invention may comprise a plurality of heads, for example 37, indexable from station to station about the conveyor. At station "1," for example, the straight two piece leading-in and supporting conductors or lead wires are automatically fed from a hopper into an indexing head. A lead wire detecting device at station "2" automatically feels the lead wires, and if both leads are not in position, a lead wire removal device at station "3" is energized. If both lead wires are in position the lead wire removal device remains inoperative.

At station "5" the lead wires may be automatically bent to the desired configuration. A lead wire flattening device at station "7" flattens the lead wires to insure a good mechanical joint with a bead. At station "9" a second lead wire detecting device feels the lead wires.

If one lead wire is missing the bead feeding unit at station "10" does not feed the head when it arrives thereat. This bead feeding device comprises a vibratory hopper which feeds the beads to a runway, where an oscillating escapement mechanism removes the beads one at a time and places them over the lead wires in the adjacent head. At station "11" a bead positioning unit pushes the bead onto the lead wires. At stations "12" through "16" the beads are heated to a plastic state so that a bead pressing device at station "17" may form the beads about the lead wires. A third detector device at station "18" feels the bead. If the bead is missing from the head a support wire inserting device does not operate at station "19."

At stations "20" and "21" the now formed bead, with the inserted center support therein, is allowed to cool. The second lead wire may be suitably bent to the desired configuration at station "22." The tops of the lead wires are suitably flattened by a lead wire flattening device at station "25." At station "26" a lead wire trimmer uniformly cuts off the tops of the flattened lead wires. A hook forming device at station "27" forms a filament hooks in the flattened trimmed ends of each of the lead wires. The center support wire is first bent and then precurled by a support wire bending and a support wire precurling device at stations "28" and "29" respectively.

At station "32" a filament is inserted through the center support curl, its legs are aligned within the hooks in the lead wires, and are then clamped thereat.

A support wire curling device at station "35" completes the curl in the center support about the filament. At station "36" the now mounted filament is stretched by a filament stretching device. A transfer device at station "37" unloads the now finished filament mount and transfers it, for example, to a machine where the mount is secured, as by soldering, to the ferrules of the reflector envelope assembly.

In it general aspect the present invention has as its objective an automatic mount making machine for projector lamps.

A specific object of the present invention is a lead wire detecting device at station "2" of an automatic mount making machine which energizes a lead wire removal device at station "3" if both lead wires are not in position in a head therebeneath.

An additional object is a lead wire detecting device at station "9" of an automatic mount making machine which renders a bead feeding device at station "10" inoperative if a lead wire is missing and a bead push-down device at station "11" for positioning the bead on the lead wires.

Other objects will become apparent to those skilled in the art to which it appertains as the description thereof proceeds both by direct recitation thereof and by implication from the context.

Referring now to the drawings in which like numerals of reference indicate similar parts throughout the several views:

Fig. 1 is a diagrammatical plan view of the automatic mount making machine of our invention.

Fig. 2 is a plan view of a lead wire detecting device at station "2" and the lead wire removal device at station "3" of the automatic mount making machine of Fig. 1.

Fig. 3 is a front elevational view of the lead wire detecting device showing the lead wire removal device in section along the line III—III of Fig. 2.

Fig. 4 is a horizontal sectional view of the detecting head of the lead wire detecting device along the line IV—IV of Fig. 3 in the direction of the arrows.

Fig. 5 is an enlarged side elevational view of the lead wire detecting head along the lines V—V of Fig. 3 in the direction of the arrows.

Fig. 6 is an enlarged front elevational view of the lead wire detecting head of Fig. 5.

Fig. 7 is a side elevational view of the lead wire removal device of Fig. 3 showing the parts thereof partially broken away along the line VII—VII of Fig. 3 in the direction of the arrows.

Fig. 8 is a horizontal sectional view of the lower portion of the lead wire removal head of the lead wire removal device along the line VIII—VIII of Fig. 7.

Fig. 9 is a schematic wiring diagram of the electrical circuit for the lead wire detector and lead wire removal devices.

Fig. 10 is a plan view of the lead wire detecting, bead feeding and bead push-down devices at stations "9," "10," and "11" of the machine of Fig. 1.

Fig. 11 is a side elevational view of the lead wire detecting, bead feeding and bead push-down devices of Fig. 10.

Fig. 12 is an enlarged vertical sectional view of the lead wire detecting device at station "9" along the lines XII—XII of Fig. 11 in the direction of the arrows.

Fig. 13 is a further enlarged front elevational view of a detecting head of the lead wire detecting device shown in Fig. 12.

Fig. 14 is a side elevational view of the vibratory hopper of the bead feeding device at station "10" and showing a partial section through the upper portion of the bead feeding chute along the lines XIV—XIV of Fig. 11 in the direction of the arrows.

Fig. 15 is an enlarged front elevational view of the bead feeding and bead turning mechanism of the bead feeding device of Fig. 11.

Fig. 16 is a horizontal sectional view of the bead feeding chute along the line XVI—XVI of Fig. 15 in the direction of the arrows.

Fig. 17 is a horizontal sectional view of the bead retaining and releasing or escapement mechanism of the bead feeding device along the line XVII—XVII of Fig. 15.

Fig 18 is a vertical sectional view of the bead feeding and bead turning mechanism along the line XVIII—XVIII of Fig. 15.

Fig. 19 is a horizontal sectional view of the bead feeding and bead turning mechanism along the lines XIX—XIX of Fig. 18, in the direction of the arrows, and showing the mechanisms rotated 90° from their position in Fig. 18.

Fig. 20 is a vertical sectional view similar to Fig. 18 of the bead turning head of bead turning mechanism in the position where a bead has just been deposited about the lead wires.

Fig. 21 is a horizontal sectional view of the bead turning head along the lines XXI—XXI of Fig. 20 showing the head rotated 90° from its position in Fig. 20.

Fig. 22 is an enlarged vertical sectional view of the bead push-down device along the lines XXII—XXII of Fig. 11.

Fig. 23 is a vertical sectional view of the bead push-down device along the lines XXIII—XXIII of Fig. 22.

Fig. 24 is a schematic wiring diagram of the electrical circuit for the lead wire detector, bead feeder and bead push-down devices.

Fig. 25 is a side elevational view of a mount for a projector lamp and fabricated on the mount making machine of our invention.

Fig. 26 is a plan elevational view of a head and a portion of the conveyor of the mount making machine of our invention.

Fig. 27 is a horizontal sectional view of the lead wire detector and bead feeder hopper support casting at station "9" along the line XXVII—XXVII of Fig. 12 in the direction of the arrows.

Fig. 28 is a view similar to Figs. 18 and 20 but showing the bead turning mechanism in an intermediate position of its combined vertical downward motion and counterclockwise rotation.

Referring now to the drawings in detail, particularly to Fig. 1, the reference numeral 10 designates an automatic mount making machine of our invention for sealed beam projector lamps. This machine 10 has a stationary table 12 provided with a conveyor or chain 14 on which are mounted a plurality of heads 16, for example 37, in the present showing of Fig. 1. The heads 16 are indexable from station to station by such conventional means as a cam and roller indexing mechanism 18, shown schematically in Fig. 1.

At station "1" straight leading-in and supporting conductors or lead wires 20 and 21, one short and one long, (shown in Figs. 2, 3, 5, 6, 7, 10, 11, 12, 13, 14, 15, 18, 20, 22, 23 and 25) are automatically fed from a hopper (not shown) into a head 16 therebelow. A lead wire detecting device 19 of our invention (Figs. 2, 3, 4, 5, 6 and 7) at station "2" engages the lead wires 20 and 21. If both of the lead wires 20 and 21 are not in position within the head 16, the detector 19 energizes a lead wire removal device 22 of our invention (Figs. 2, 3, 7 and 8) at station "3." At station "5" the middle portions of the lead wires 20 and 21 in the head 16 are bent to receive a bead 45. The bead engaging portions of the lead wires 20 and 21 are flattened at station "7."

At station "9" a lead wire detector 30 of our invention (Figs. 10, 11, 12 and 13) engages the lead wires 20 and 21. If one or both of the lead wires 20 and 21 are not in place a bead feeder 40, of our invention, at station "10" (Figs. 10, 11, 14, 15, 16, 17, 18, 19, 20 and 21) is not energized, and a bead 45 (Figs. 11, 14, 15, 18, 22 and 23) is not automatically placed over the lead wires. At station "11" a bead positioner or bead push-down device 50 (Figs. 22 and 23) pushes the bead 45 down on the lead wires 20 and 21 into the proper sealing position on a head 16.

At station "12" through "16" the bead 45 is gradually heated to a semi-plastic condition. The bead 45 is then pressed about the lead wires 20 and 21 at station "17." A third detector (not shown) at station "18" engages the bead 45. If the bead 45 is missing, a center support wire 52 (Fig. 25) is not inserted into the bead 45 at station "19." The now sealed bead 45 is permitted to cool at stations "20" and "21." The upper portions of the beaded lead wires 20 and 21 (Fig. 25) are given a second bend at station "22" preparatory to mounting a filament 54 thereon. The tops of the lead wires 20 and 21 are successively flattened, trimmed and provided with a hook thereat at stations "25," "26" and "27" respectively. The center support wire 52 is bent and precurled at stations "28" and "29." At station "32" the filament 54 is inserted through the precurl of the center support wire 52. The legs of the filament 54 are positioned within the hooks in the tops of the lead wires 20 and 21 and clamped therein. The center support wire 52 is finally curled and the filament 54 is stretched at stations "35" and "36" respectively. The now completed filament mount 56 (Fig. 25) is unloaded at station "37" and transferred to a sealing machine.

*Head*

As shown particularly in Figs. 2, 3, 7, 11, 14 and 26, each of the heads 16 has a flanged body portion 60 which is secured, as by bolts, to a pad 62 (Fig. 26) carried by a link 64 of the conveyor 14. These links 64 of the conveyor 14, one for each of the heads 16, are connected together in overlapping engagement by pintle pins 66.

As shown particularly in Figs. 7 and 14 each of the pintle pins 66 carry an upper roller 68, an intermediate roller 70 and a lower roller (not shown) for engagement respectively with an upper vertical track 72, horizontal intermediate track 74 and a lower horizontal track (not shown). The above mentioned tracks 72 and 74, as well as the lower track (not shown) are secured, as by bolts, to a track support bracket 76 which depends from the table 12 of the machine 10.

In addition, each of the heads 16 (Fig. 11) is provided with lead receiving pockets 78 and 80 for reception therein of the short and long lead wires 20 and 21 respectively. The top portion of each head 16 is suitably provided with a bending groove or guide slot to facilitate the above mentioned formation of the first bend in the middle portions of the lead wires 20 and 21 at station "5."

*Lead wire detector at station "2"*

The lead wire detector 19 of our invention at station "2" of the machine 10, shown in Figs. 2, 3, 4, 5, 6, and 7, has a lead wire detector support casting 100 (Figs. 2, 3 and 7) mounted, as by bolts, on the table 12 of the machine 10.

The casting 100, of generally hollow construction with vertical reinforcing ribs, carries a lever arm shaft 102, suitably journalled (Fig. 7) in its upper portion. A cam roller lever arm 104 on the shaft 102 carries a roller 106 on its free or right hand end, when viewed in Fig. 7. This roller 106 is maintained in engagement with a cam 108 on a cam shaft 310, suitably journalled in upstanding brackets (not shown) on the table 12 of the machine 10. A spring 110 (Figs. 2, 3, 7), extending between suitable anchor pins projecting from the cam lever arm 104 and the lower portion of the casting 100, maintains the roller 106 in engagement with the cam 108.

A lever operating arm 112 (Figs. 2 and 7) is connected by means of a flanged follower 114 (Fig. 3) to the upper end of a push-rod 116 of appropriate square cross-section. This push-rod 116 is reciprocable in a suitable guide 118 machined in a right hand off-set end portion 119 (when viewed in Fig. 2) of the casting 100. A cover plate 120 (Fig. 4) on the portion 119, for example, maintains the push-rod in axial alignment during its reciprocation. The lower end of the push-rod 116 carries a lead wire detecting head 122 shown particularly in Figs. 3, 5, 6 and 7.

*Detecting head*

The lead wire detecting head 122, shown particularly in Figs. 5 and 6, has a block-like body 124 secured, as by bolts, to the lower end of the push-rod 116. The lower portion of the body 124 is suitably of reduced width (Fig. 6) and carries on either side thereof a pair of movable contact arms 126 and 128, each pivotable on a suitable pin 130 projecting into the right hand lower portion of the body 124 (when viewed in Fig. 5). Each of the contact arms 126 and 128 carries an upper contact 132 and 134 respectively.

A stationary U-shaped lower contact block 138 (Figs. 3, 5, and 6) electrically insulated from the detecting head body 124 is secured to the bottom portion of the body 124, as by bolts. This contact block 138 carries a pair of stationary lower contacts 140 and 142 which are in normally closed engagement with the upper movable contacts 132 and 134 thereabove. It will be understood (as is shown particularly in Fig. 5) that the upper contact arms 126 and 128 carry the upper movable contacts 132 and 134 near, but not at, the free ends thereof. An insulated lead wire engaging or contact pad 146 (Fig. 5) is carried at the outer extremity of the free end of each of the movable contact arms 126 and 128, as shown particularly in Fig. 5.

A line or conductor 150 extends from a junction point 151 in one side of a suitable voltage supply line 152 to the lower contact block 138 and hence to the stationary contacts 140 and 142. A second conductor 153 (Figs. 6 and 9) extends from a junction point 153' (Fig. 9) to the lead wire detecting head body 124, contact arms 126 and 128, and hence the upper movable contacts 132 and 134.

*Operation of lead wire detector at station "2"*

At a time, as predetermined by the cam 108 on the cam shaft 310, a high dwell on the cam 108 moves the cam roller arm 104 and the lever operating arm 112 in a counterclockwise direction as viewed in Fig. 2. The counterclockwise rotation of the operating lever 112 moves the push-rod 116 and hence the lead wire detecting head 122 downwardly toward a short lead wire 20 and a long lead wire 21, positioned in a head 16 therebeneath.

If both the lead wires 20 and 21 are in the head 16 therebeneath, the lead wire contact pads 146 on the movable contact arms 126 and 128 will engage the upper end of the lead wires 20 and 21 causing the arms 126 and 128 to pivot upwardly on the pins 130, thus breaking the contact between the movable upper contacts 132 and 134 and the stationary lower contacts 140 and 142. The breaking of these contacts (Fig. 9) deenergizes the lead wire remover 22 at station "3," as hereinafter explained.

If, for example, as is shown in Fig. 6, the long lead wire 21 is missing, the short lead wire 20 (as in the prior case) will engage the lead wire pad 146 on the movable contact arm 126 causing the arm 126 to pivot upwardly and break the contact between the upper movable contact 132 and the stationary lower contact 140. It will be understood, however, that the right hand contacts 134 and 142, when viewed in Fig. 6, are still closed and the circuit (Fig. 9) leading to the lead wire remover is still energized. Hence, at station "3" the lead wire remover 22 will operate to remove the remaining lead wire 20 from the head 16.

Obviously, if both the short lead wire 20 and the long lead wire 21 are missing from a head 16 beneath the lead wire detector 19, the above described detecting circuit (Fig. 9) will remain closed and the lead wire remover 22 at station "23" will operate, albeit needlessly at station "3."

*Lead wire removal device at station "3"*

The lead wire removal device 22 at station "3" (Figs. 2, 3, 7 and 8) has a casting 200 mounted, as by bolts, to the table 12 of the machine. This hollow casting 200 of generally rectangular horizontal cross-section, has opposed vertical side walls 201 (Fig. 2) which are reinforced with a plurality of vertical ribs and has, when viewed in Fig. 2, a left hand outer offset cam track support member 202 which projects vertically from the main body of the casting 200 and adjacent to a head 16 at station "3." A lead wire removal slide bracket 204 is adjustably mounted and keyed, as at 205 (Fig. 2), to the right hand side wall 201, when viewed in Fig. 2, of the casting 200.

As shown particularly in Figs. 2 and 8, this slide bracket 204 is provided with a dove-tail guide 206 in which an L-shaped (Fig. 3) lead wire removal device slide 208 reciprocates. This slide 208 (Fig. 7) is carried on the lower end of an operating rod 210 of a double action air cylinder 212 mounted on a bracket 214 upstanding from the slide bracket 204 (Fig. 3). As shown in Fig. 3 the upper portion of the slide 208 is joined to the lower portion of the operating rod 210 by means of a combination retaining plate and mercury switch reversing block 216. The lower portion of the L-shaped slide 208 (Fig. 3) carries a pair of pivoted scissor-like lead wire removal jaw arms 220 and 222 (Figs. 3 and 7). The arms 220 and 222 are pivotably mounted on the lower portion of the slide 208, by means of a pivot pin 224 (Figs. 3 and 7).

As shown particularly in Fig. 7 the lower portions of the arms 220 and 222 are provided with lead wire gripping pads or jaws 226 and 227 respectively. A spring 228, extending between anchor pins projecting from the lower portions of the arms 220 and 222, spring biases these arms toward each other. The upper ends of the arms 220 and 222 carry respectively, cam track rollers 229 and 230 which are held in normal engagement (by means of the spring 228) with stationary cam tracks 231 (Figs. 3 and 7) cut in the opposite faces of a cam track plate 232.

This vertical cam track plate 232 is mounted, as by bolts (Figs. 2, 3, and 8), to the inner surface of the offset support member 202 of the casting 200. Each track 231 has a generally straight but narrow center body portion 233 (Fig. 7) and is provided at its lower end with an outwardly curving portiton 234 which leads to a relatively shorter jaw opening portion 235 of relatively greater width than the center portion 233. The upper end of each of the cam tracks 231 (Fig. 7) is likewise provided with an arcuate outwardly diverging portion 236 which again leads to a vertical jaw opening portion 237 relatively wider than the center portion 233 thereof.

As shown in Figs. 3 and 7 a lead wire disposal chute unit 240 has a trip lever 242 (Fig. 7) pivoted on a bracket 244 secured to the side wall of the slide bracket 204 (Fig. 3).

Lead wire disposal chute

The right hand end, when viewed in Fig. 7, of the trip lever 242 (Fig. 3) is joined by an adjustable connecting rod 246 to the right hand end of an operating lever 248 suitably pivoted on a bracket similar to the lever bracket 244, and projecting from the inner side wall of the slide bracket 204 (Fig. 3). The left hand end of the operating lever 248, when viewed in Figs. 7 or 8, carries a lead wire disposal chute 250 of generally U-shaped horizontal cross-section.

The upper end of this chute 250 is secured to the free end of the operating lever 248. In its normal rest position (Fig. 7) the chute 250 depends in a plane parallel to the vertical axis of the lead wire removal unit 22. As shown in Figs. 3 and 7 the trip lever 242 carries a mercury switch 252 (also shown in Fig. 9) which reverses the air cylinder 212 and causes said cylinder operating rod 210 to return to its normal lower rest position (Fig. 7), as hereinafter explained. A return spring 253 (Fig. 3) extends from an anchor pin projecting from the side wall 201 of the casting 200 to a like pin on the operating lever 248.

Operation of the lead wire removal unit

When the lead wire detector 19 at station "2" indicates that one or more of the leads 20 and 21 are missing from a head 16 thereat, a memory circuit (Fig. 9) hereinafter to be explained, actuates a solenoid operated air valve in a high pressure air line (not shown) leading to the air cylinder 212 at station "3," when said head 16 indexes thereto. In the showing of Fig. 7 it will be understood that the lead wire removal unit 22 is in its normal rest or inoperative position. Upon being activated the air cylinder operating rod 210 and the slide 208 affixed thereto move upwardly.

Each of the rollers 229 and 230 on the jaw arms 220 and 222 (which are pivoted on the lower block-like portion of the slide 208) roll off the relatively wider lower straight portion 235 of the cam track 232 onto the curved arcuate portions 234, and hence to the relatively narrow center portion 233 of the cam track 232. This motion of the rollers 229 and 230 causes the jaws 226 and 227 on the free ends of the jaw arms 220 and 222 to move inwardly toward the axis of the lead wire removal unit 22 and to grip the lead 20 or 21 therebetween thus removing them from the head 16 therebeneath, as the rollers 229 and 230 continue upwardly along the straight narrow portion 233 of the cam track 232. The slide 208 carrying, of course, the trip block 216 thereon (Figs. 3 and 7) likewise moves upwardly until the block 216 hits the free or contact portion of the trip lever 242 of the lead wire disposal chute unit 240 thus causing the connecting rod 246 to move downwardly. The downward motion of the connecting rod 246 moves the chute carrying end of the operating lever 248 and hence the chute 250 in a clockwise direction toward the vertical axis of the lead wire removal device 22 to catch therein the lead wire 20 or 21 still held within the jaws 226 and 227.

The further upward movement of the slide 208 causes the rollers 229 and 230 on jaw arms 220 and 222 to each engage the upper curved portion 236 and finally the straight upper portion 237 of greater width than the center portion 233 of the cam track 232. It is obvious that as the roller 229 and 230 move outwardly from center portions 223, that the jaws 226 and 227 on the lower ends of the jaws of 220 and 222 release the lead wire 20 or 21 permitting said leads to fall downwardly by gravity through the chute 250 therebeneath into a disposal box (not shown).

It will be understood that when the trip lever 242 was moved clockwise by the action of the trip block 216 that the mercury switch 252 (Fig. 9) operates (as hereinafter explained in detail) to reverse said cylinder 212 and cause the cylinder rod 210 to move downwardly. Downward motion of the operating rod 210 and the slide 208 causes the block 216 to return the spring biased lever arm 242 and the switch 252 to its original position, shown in Fig. 7. The rollers 229 and 230 retraverse the above described cam track path and finally come to rest in the position shown in Fig. 7 with the jaws 226 and 227 on the jaw arms 220 and 222 respectively, in the "open" position.

Lead wire detector at station "9"

The lead wire detector 30 of our invention at station "9" of the automatic mount machine 10, shown particularly in Figs. 10, 11, 12 and 13, has a combination lead wire detector and bead feeder hopper support casting 300 (Figs. 12 and 27) which is bullet-like in horizontal cross section and has a pair of vertical reinforcing ribs 301. The center upper portion of the casting 300 (Fig. 12) carries a cam lever shaft 302 suitably journalled therein. A cam lever roller arm 304 is fixed to the shaft 302 and is provided on its right hand end, when viewed in Fig. 12, with a cam follower or roller 306 for engagement with an open faced cam 308 keyed to a cam shaft 310. This cam shaft 310 is mounted, as shown in Fig. 10, on suitable bearings (not shown) secured to the top of the table 12.

A cam lever spring 320 (Fig. 12) extends from an anchor pin 321 on the cam lever arm 304 (suitably midway between the shaft 302 and the cam roller 306) to a second anchor pin 322 extending from the side wall of the casting 300. The spring 320 maintains the cam roller 306 in engagement with the cam 308.

The left hand end of a cam lever drive arm 326 on shaft 302, (when viewed in Fig. 12) is connected by means of a flanged follower 330 to the upper end of a push-rod 332. The rod 332 is reciprocable in a suitable guide 334 machined in the left end (when viewed in Fig. 12) of the casting 300. A cover plate 336 (Figs. 11 and 12) retains the push-rod 332 within the guide 334. Axial reciprocation of the push-rod 332 within the slide 334 may be assured by positive means, such as keying the push-rod 332 to the cover plate 336. The lower end of the push-rod 332, depending below the guide 334 carries thereon a lead wire detector head 340, shown particularly in Figs. 12 and 13.

Lead wire detecting head

A body or block 342 of the detecting head 340 (Figs. 12 and 13) carries a lower stationary contact holder or plate 344 secured to the underside thereof, as by bolts. The holder 344 carries a pair of stationary lower contacts 346 and 347 on the upper surface thereof. These contacts 346 and 347 remain in normally closed engagement with movable upper contacts 348 and 349, carried by movable upper contact arms 350 and 352 respectively.

These upper contact arms 350 and 352 are pivoted on suitable pins extending through flanged lateral portions 354 and 356 of the body 342.

As shown particularly in Figs. 13 and 24 one side of a voltage supply is connected to the upper movable contacts 348 and 349 by means of an inlet supply line or conductor 360 which is divided by means of lugs 362, secured to the block 342, into flexible lines 364 and 366, secured to the movable contact arms 350 and 352. The other side of the supply is connected by means of a conductor 370 (Figs. 12, 13 and 24) to the lower stationary contact holder 344.

*Operation of lead wire detector at station "9"*

It will be understood that when the cam roller 306 engages a high dwell in the cam 308 on the main cam shaft 310, the right hand end, when viewed in Fig. 12 of the cam lever arm 304 and hence the shaft 302 and the drive arm 326 rotate counterclockwise. The push-rod 332 and the lead wire detecting head 340 thereon move downwardly toward the leads 20 and 21 (Figs. 12 and 13) secured in the pockets 78 and 80 of the head 16 therebeneath.

If both a short lead wire 20 and a long lead wire 21 are in the head 16, the detecting head 340 (due to the U-shaped configuration of the stationary lower contact holder 344) moves downwardly past the upper end portions of the lead wires 20 and 21 until the tops of the lead wires engage the free inner ends of the upper contact arms 350 and 352 causing them to move upwardly to open a circuit (Fig. 24) and to actuate the bead feeder 40. Opening of this circuit permits operation at station "10," as hereinafter explained.

If either the short lead wire 20 or the long lead wire 21 is missing, only one of the contact arms 350 and 352 is moved upwardly and hence only one side of the detector head circuit is broken. As hereinafter explained this breaking of one contact opens a circuit (Fig. 24) and prevents the bead feeder 40 at station "10" from operating. If of course the short lead wire 20 and the long lead wire 21 are missing neither of the movable contact arms 350 and 352 will be moved upwardly and the contacts 346 through 349 remain closed thus preventing the bead feeder 40 from feeding a bead 45 at the next adjacent station, station "10."

*Bead feeder at station "10" hopper*

The bead feeder 40 at station "10," shown particularly in Figs. 10, 11, 14, 15, 16, 17, 18, 19, 20 and 21 has a vibratory hopper 400 mounted on the support casting 300. As shown in Fig. 27 the right hand end of the casting 300 (when viewed in Fig. 27) is provided with a mounting hole 402 having an adjustable slotted outer portion. A support rod 404 (Figs. 11, 12, and 14) is mounted within the hole 402 and secured therein, as by bolts. A hopper platform 406 is secured to the upper end of the mount rod 404 by means of its lower depending hub, (Figs. 11 and 14). The hopper 400 is mounted, as by bolts, on the platform 406.

This hopper 400 may comprise an open ended container provided with a helical track 410 (Fig. 14) machined in the inner wall thereof and vibratory means (not shown) for vibrating a steady flow of beads 45 up the inclined track 410 to a bead delivery chute 412 (Figs. 10, 11 and 14). This chute 412 connects the track 410 to a vertical magazine 413 having a bead feed channel 414 (Fig. 16) therein and is provided with an annular bead guide 415 (Fig. 14) on its upper entrance end.

The magazine 413 is supported by a magazine support or bracket 416 secured to the hopper support platform 406, as by bolts, as shown particularly in Fig. 14. In addition the magazine 413 has a slotted hinged cover plate 418 (Figs. 11, 15, 16 and 18) which is readily removable to permit cleaning and the freeing of beads 45 which may become jammed in the bead magazine 413. The cover is held in normally closed position by resilient catches 421 (Fig. 16). This magazine 413 extends substantially below the platform 406 and terminates slightly above the table 12 of the machine 10, Fig. 14. The lower end of the magazine 413 below the cover plate 418 is covered with an escapement mounting plate 419 provided with top and bottom escapement plunger holes 420 and 422 respectively (Fig. 18) for cooperation with a bead feeder escapement mechanism 430 (Figs. 14, 15, 17, 18 and 20).

*Escapement mechanism*

The escapement mechanism 430 has a solenoid 432 (Figs. 11 and 14) mounted on the lower portions of the bead magazine bracket 416. An escapement push-rod 434 is connected to the lower end of an operating plunger 436 of the solenoid 432. The lower end of the escapement push-rod 434 carries links 437 which are suitably keyed to a bead release shaft 438 (Figs. 14, 15, and 20). This bead release shaft 438 is suitably journalled in the lower portions of the magazine 413 (Figs. 14 and 20) and carries (adjacent in the magazine 413 and between the link 436) a rocker block 440. The upper and lower portions of the rocker block 440 are provided with an adjustable upper trip screw 442 and a lower trip screw 444 (Figs. 14 and 20) respectively.

As shown in Figs. 14, 17, and 20, the left hand end of the upper trip screw 442 is in engagement with a resilient upper feed finger 450, whereas the lower release trip screw 444 is not in contact with a likewise resilient lower feed finger 452. As shown particularly in Fig. 17 the upper feed finger 450 is pivoted on the vertical mounting plate 419 below the front cover plate 418 (Fig. 15). An adjustable spring tensioned bolt 456 extends through the upper feed finger 450 and the plate or bracket 419 thus biasing the upper feed finger 450 (Fig. 17) against the bracket 419 or the upper screw 442. As shown particularly in Figs. 17 and 18 the upper feed finger 450 carries an operating screw or pin 458 which is operable in and out of the upper escapement hole 420 in the plate 419.

The lower feed finger 452 (Figs. 15, 18 and 20) is mounted in the same manner as is the upper feed finger 450, and carries a lower operating screw or pin 460 thereon for reciprocable lateral motion in and out of the lower escapement operating hole 422 in the plate 419. From Fig. 18 it will be understood that the distance between the upper and lower escapement holes 420 and 422 is 1½ diameters of a bead 45. In this way when the lower feed finger operating screw 460 projects into channel 414, as shown in Fig. 18, the upper feed finger operating screw 458 is in axial alignment with the hollow portion of a bead 45 to prevent crushing thereof, as hereinafter explained.

*Escapement mechanism operation*

In Figs. 14, 18 and 20, the upper feed finger operating screw 458 is in its "out" position, having been so positioned by its engagement with the upper trip screw 442. The lower operating screw 460, not being in engagement with the lower release trip screw 444, is in its "in" position and has the lower portion of the bead 45 resting on its inner projecting end. In this position unless the solenoid 432 is activated by the lead wire detector 30 at station "9" (Fig. 24) as hereinafter explained, the bead 45 resting on the lower feed finger operating screw 460 will not be fed to a head 16 indexing into station "10" of the machine 10.

If, however, a head 16 at station "9" is provided with a short lead wire 20 and a long lead wire 21, the lead wire detector 30 will actuate the solenoid 432 (Fig. 24) causing the push-rod 434 to move upwardly. This upward movement of the rod 434 causes the links 437, the shaft 438, the rocker block 440 and hence the upper trip screw 442 and the lower trip screw 444 to rotate clockwise. This clockwise rotation causes the lower trip screw 444 to engage the lower feed finger 452 (Figs. 14 and 20) moving said finger 452 to the left, when viewed in Fig. 20, and permitting the bead 45 which had been resting on the inner end of the finger 452 to drop downwardly through the delivery end of the bead feeding channel 414 into a bead turning mechanism 470 (Figs. 11, 14, 15, 18, 19, 20 and 21) therebelow. Simultaneously, the upper bead release trip screw 442 on the rocker block 440 releases the upper feed finger 450 (Fig. 20) permitting the upper feed finger operating screw 458 to engage the bead 45 adjacent thereto and preventing it from dropping downwardly through the delivery end of the bead channel 414 along with the delivered bead 45 therebelow.

Before the end of the index cycle the escapement mechanism 430 is rotated counterclockwise to the position shown in Figs. 14, 15 and 20, as limited by a stop 468 mounted by means of a bracket on the magazine 413.

Bead turning mechanism

The bead turning mechanism 470 (Figs. 10, 11, 14, 15, 18, 19, 20 and 21) has a support casting 472 mounted on the table 12 of the machine 10, as by bolts. This casting 472, similar in part to the lead wire detector and support casting 300 (Figs. 12 and 27), is generally hollow and, like the casting 300, has a plurality of vertical reinforcing ribs (not shown). The right hand upper end of the casting 472, when viewed in Fig. 14, carries a shaft 474 journalled therein. A roller arm 476 is fixed to the shaft 474 and carries a cam roller 478 on its outer side for engagement with an open faced cam 480, suitably keyed to the cam shaft 310. A positioning spring 482 extending between suitable anchor pins, one on the cam roller arm 476 and the other extending from the casting 472, maintains the roller 478 in engagement with the cam 480.

This shaft 474 also carries an operating arm 484 which is connected (Fig. 14) by a a flanged follower 486 to the upper end of a slide 488. This slide 488 is reciprocable in a suitable dove-tailed guide 490 having divergent end portions (Fig. 19) and machined in the left hand end, when viewed in Fig. 14, of the casting 472.

Below the cover plate for the slide 490 a generally U-shaped bead turning mechanism mounting bracket or yoke 492 (Figs. 14, 15, 18, 19, and 29) is secured to the bottom portion of the slide 488 by means of bolts. Each of the bifurcations or the vertical side walls of the yoke 492 is provided with a quadrental arcuate track pin clearance slot 494 (Figs. 18, 19 and 20). These slots 494 in the right hand end (when viewed in Fig. 18) of the side walls of the yoke 492 extend substantially 90° from the vertical axis of the yoke 492 in a clockwise direction. A pair of pivot pins 496 extend from the side walls of a block or body 498 and pivot in pivot pin bearings 498' (Fig. 19) in the side walls of the yoke 492 to permit the rotation of the block 90° in a counterclockwise direction as viewed in Fig. 8, as hereinafter described.

As shown particularly in Fig. 19, a plate 500 is mounted, as by bolts, to the support casting 472 adjacent the bifurcations or the vertical side walls of the yoke 492. Each of the cam track plates 500 (Figs. 18 and 20) is provided with a vertical cam track 501 having upper and lower vertical end portions vertically offset from each other and connected by an inclined center portion. Each of headed track pins 502 (Fig. 19) extend from the rearward portions of the block 498 through a slot 494 in the yoke 492 and rides in, or engages, the cam track 501.

The block 498 is provided with a bead receiving cavity or chamber 503, which in the showing of Fig. 18 (when the bead turning mechanism 470 is in the bead receiving position) has a bead feeding aperture 504 directly beneath the outlet or delivery end of the channel 414 in the magazine 413. This bead receiving cavity 503 has a heighth (in the showing of Fig. 18 and a width in the showing of Fig. 20) substantially the same as the diameter of a bed 45. Across the delivery end of the bead receiving cavity 503 (the left hand end when viewed in Fig. 18 and the lower end when viewed in Fig. 20) a pair of pivotable bead retaining jaws or fingers 505 (Fig. 21) are mounted in normally closed relationship.

Each of the retaining fingers 505 is pivoted on a suitable pin 506 extending therethrough into the body 498 of the bead turning mechanism 470. The free end of each of the bead retaining fingers 505, (the lower end when viewed in Fig. 18 and the right hand end when viewed in Fig. 20) carries a cam track button 507 (Figs. 11, 15, 16, 18 and 20) for engagement with a pair of stationary finger opening wedges 508 (Fig. 15) mounted on the table 12 of the machine 10. As shown particularly in Fig. 15 the opposite bead retaining portions of the fingers 505 are secured in their normally closed engagement across the delivery end of the bead receiving cavity 502 by means of a spring 510 extending from a pin mounted on each finger 505.

Operating of the bead turning mechanism

As hereinbefore mentioned, the escapement mechanism 430 of the bead feeder 40 permits a bead 45 to descend by means of gravity through the delivery end of the channel 414 of the magazine 413 through the delivery aperture 504 in the bead turning cavity 503 in the body 498 as shown in Fig. 18, where it will be understood that the bead turning mechanism 470 is shown in its uppermost position.

At a time determined by the cam 480 (Fig. 14) on the main cam shaft 310, the roller arm 476 and the operating arm 484 will be rotated counterclockwise, as viewed in Fig. 14, by a high dwell on the cam 480. This counterclockwise rotation causes the slide 488 and hence the yoke 492 with the body 498 pivoted therein, to move downwardly and rotate counterclockwise to the position shown in Fig. 20.

As the body 498 of the bead turning mechanism 470 moves downwardly (Fig. 28) it will be understood that the pivot pins 496 move in a vertically axial line. Since the distance between the pivot pins 496 and the cam track pins 502 is fixed the cam track pins 502 will be restrained by the curved connecting portion of the cam track 501 permitting the block 498 to rotate counterclockwise, as viewed in Fig. 28, with the aid of the clearance slots 494 in the yoke 492.

Rotation of the block 498 causes the bead 45 to drop downwardly onto the retaining fingers 505 (Figs. 19, 21) in axial alignment with the short lead wire 20 and the long lead wire 21 held in a head 16 therebeneath so that, during the remaining vertical downward travel of the turning mechanism 470, the lead wires pass through the hollow portion of the bead 45. As shown particularly in Fig. 15, as the bead turning mechanism 470 approaches the bottom of its vertical travel the buttons 507 on the ends of the bead retaining fingers 505 engage the stationary wedges 508 on the table 12. The inwardly diverging surfaces of the wedges 508 causes the bead retaining ends of the fiingers 505 to diverge outwardly from the axis of the head 16 and permit the positioned bead 45 to slide downwardly on the leads 20 and 21 finally coming to rest on top of the head 16.

In the event that the bead 45, due to improper bending of the leads 20 and 21 at station "5," does not slide or move all the way down on the leads 20 and 21, the lead push-down device 50 (Figs. 22 and 23) will push the bead 45 into the proper sealing position at station "11."

Bead push-down device at station "11"

The bead push-down device 50 (Figs. 11, 22 and 23) at station "11" of the machine 10 has a generally hollow up-right support casting 600 mounted, as by bolts, to the table 12 of the machine 10. This support casting 600, similar in general configuration to the lead wire detector castings 100 and 300 and the bead feeder support casting 472 carries a lever shaft 602 journalled in its upper portion. A cam roller arm 604, fixed to one side of the shaft 602, carries a roller 606 for engagement with a cam 608 on the cam shaft 310 of the machine 10. An operating lever arm 610, also on the shaft 602, is connected, as shown in Figs. 22 and 23 at its outer bifurcated end to the upper end of a push-rod 612. A spring 614 extending between anchor pins projecting from the lever arm 610 and the support casting 600 maintains the roller 606 in engagement with the cam 608.

This push-rod 612 is reciprocable in a horizontal combination guide and stop 616 mounted on a bracket 618 upstanding from the table 14 of the machine 10 or the support casting 600. This push-rod 612 is joined, as by bolts, (Figs. 22 and 23) below the guide 614 to a push-down finger 620. The finger 620 has a generally shoe-like lower portion contourned, as shown in Fig. 23, to reciprocate between the small lead wire 20 and the large lead wire 21 in a head 16 at station "11," and engage a bead 45 on these above mentioned leads to seat the bead 45 down on the head 16 in the proper sealing position.

*Operation of the bead push-down device*

At a time predetermined by the cam 608 on the cam shaft 310 on the table 12 of the machine 10, a low dwell (Fig. 22) on the cam 608 causes the roller arm 604 and the operating arm 610 to rotate counterclockwise. This rotation causes the push-rod 612 to move downwardly through the guide 616 so that the lower shoe-like portion of the finger 620 moves between the small lead wire 20 and the large lead wire 21 into engagement with the bead 45 thereabout and continues downwardly until the bead is seated on the head 16 therebeneath, thus insuring a proper sealing position of a bead 45 with respect to the leads 20 and 21.

*Circuit for lead wire detector and lead wire removal device*

The circuit for the lead wire detector 19 and the lead wire removal device 22 (Fig. 9) has two integrated circuits, namely, a detecting circuit 700 and a memory circuit 702.

*Detecting circuit*

The detecting circuit 700 has a suitable fuse 704, a manually operated switch 706, a cam operated normally closed reset switch 708, a cam operated normally open set-up switch 710, and a coil 712 of a relay 714 (having three normally open contacts) all in series with a suitable electronic switch, such as a thyratron 716, and the pairs of contacts of the detecting head 122, namely, movable contact 132 and stationary contact 140 and movable contacts 134 and 142, respectively.

This detecting circuit 700 is accomplished by a conductor 720 which extends from a junction point with a 110 volt supply line 721 through the fuse 704 and the manually operated switch 706 to a junction point 722 with a conductor 723 in the detecting circuit 700 and a conductor 724 in the memory circuit 702. This conductor 723 in the detecting circuit 700 extends through the cam operated normally closed reset switch 708, a junction point 726, the cam operated normally open set-up switch 710, a second junction point 727, the coil 712 of the relay 714 and a current limiting resistor 728 to an anode 730 of the thyratron 716. This work portion of the detecting circuit 700 carries the plate or work current, about 1 ampere, sufficient, for example, to energize the coil 712 of the relay 714.

A conductor 732 extends from the first junction point 726 (with the conductor 723) through normally open holding contacts 734 of the relay 714 to the second junction point 727 with the conductor 723. It will be understood that after the operation of the cam operated normally open switch 710 that these holding contacts 734 of the relay 714 maintain the detecting circuit in a closed condition.

In addition to the anode 730, the thyratron 716 may have a shield grid 736, a control grid 738 and a cathode 739 indirectly heated by a filamentary heater 740. The shield grid 736 is connected by a conductor 741 through a junction point with a conductor 742 (leading to the cathode 739), a junction point with a conductor 743 (leading to the heater 740), and a junction point 744 to a junction point with the before mentioned 110 volt supply conductor 152.

A conductor 746 joins the control grid 738 through a junction point 747, a grid current limiting resistor 748, and a second junction point 749 to a junction point 153' with the conductor 153 leading to the movable contacts 132 and 134 of the detecting head 122. This grid or sensing portion of the detecting circuit carries the grid current, suitably a few micro amperes, to prevent arcing and resultant pitting of the lead wires 20 and 21 during making and breaking of the sensing means. A conductor 751 extends from the junction point 747 with the line 746 through a condenser 752 to the junction point 744 with the line 741. This condenser 752 maintains the proper phase relationship between the cathode 739 and the control grid 738.

A conductor 754 extends from the junction point 749 with the conductor 746 through a filament biasing resistor 755 and a junction point 756 to a suitable low voltage filament or heater supply (not shown). As is readily seen from Fig. 9 the heater conductor 743 further connects the heater 740 to the junction point 756 with the line 754.

From the junction point 153' with the lines 153 and 746 a conductor 758 extends through normally open contacts 760 of the relay 714 and thence to a junction point with the supply line conductor 152. The contacts 760 of the relay 714 insure positive closing of the detecting circuit 700, if (due to machine vibration or improper bending of the lead wires 20 and 21) contact between the movable and stationary contacts of the detecting head 122 is only momentarily broken. The contacts 760 thus insure the positive operation of the lead wire removal device 22 at station "3."

*Memory circuit*

The memory circuit 702 comprises essentially a pair of normally open set-up contacts 761 of the relay 714 (in the detecting circuit 700) in series with a normally open cam operated set-up switch 762, a coil 764 of a relay 766 (having two pair of normally open and one pair of normally closed contacts) and the aforementioned normally closed mercury switch 252 (carried on the trip lever 242 of the lead wire disposal chute unit 240 of the lead wire removal unit 22), (Fig. 7). In addition a pair of normally open holding contacts 768 of the relay 766 are in parallel with the set-up contacts 761 of the relay 714 and the cam operated switch 762. Further, a pair of normally open contacts 770 of the relay 766 are in series with a solenoid "removal" coil 772 of a two-way air valve 773 and are in parallel with the aforementioned series memory circuit involving the mercury switch 252, the coil 764 of the relay 766, the switch 762 and the contacts 761. Another pair of normally closed contacts 774, of the relay 766 are in series with a second "return" or "down" coil 775 of the valve 773 and these also are in parallel with the series circuit involving the mercury switch 252, the coil 764 of the relay 766, the switch 762 and the contacts 760.

This memory circuit 702 is accomplished by the aforementioned conductor 724 which extends from the junction point 722 with the conductor 723 (in the detecting circuit 700) through a series of junction points 780, 781 and 782, the normally closed contacts 774 of the relay 766, and the "return" coil 775 of the valve 773 to a junction point 783. From the junction point 781 with the line 724 a conductor 784 joins the normally open holding set-up contacts 761 of the relay 714, a junction point 785, the cam operated normally open switch 762, a second junction point 786, the coil 764 of the relay 766 and the mercury switch 252 to a junction point with the 110 volt supply line 152.

A conductor 787 interconnects the junction point 780 with the conductor 724, the normally open holding contacts 768 of the relay 766 and the junction point 786 with the conductor 784. A colored signal lamp 788 is connected by a conductor 789, which extends from the junction point 785 with the conductor 784 through said lamp 788, to a junction point with the 110 volt conductor 152.

A conductor 790 connects the junction point 782 with the conductor 724, the normally open contacts 770 of the relay 766 the "removal" coil 772 of the solenoid air valve 773 and the junction point 783 with the conductor 724 to a junction point with the 110 volt conductor 152.

Operation of the circuit for lead wire detector and lead wire removal device It will be understood that if both the short lead wire 20 and the long lead wire 21 are in a head 16 at station "2" of the machine 10, the contact between the pairs of movable and stationary contacts, namely, 132 and 140 and 134 and 142 will be broken and that the relay 714 in the detecting circuit 700 will not be energized. Hence, the only complete circuit existing in the showing of Fig. 9 is the circuit comprising the conductor 724, the normally closed contacts 774 of the relay 776, and the second "return" coil 775 of the air valve 773, the conductor 790 and the line voltage conductor 152. Since this "return" coil 775 of the valve 773 maintains the lead wire removal device 22 in its lower or normal rest position, as shown in Fig. 7, the lead wire removal device 22 will not operate at station "3" when said head 16 indexes therein.

If, however, for example, either or both of the lead wires 20 and 21 are missing from a head 16 at station "2" of the machine 10, at least one of the pairs of contacts either 132 and 140 or 134 and 142 or both will remain closed. It must be understood that just prior to the detecting of the lead wires 20 and 21 by the detecting head 122 of the lead wire detector 19, that the normally open cam operated switch 710 in the detecting circuit 700 closes so that when the detecting is actually done by the head 122 a closed circuit exists through the cam operated switches 708, 710, the coil 712 of the relay 714 and the thyratron 730, thus energizing the coil 712 of the relay 714.

Energization of the relay 714 closes the normally open holding contacts 734 in parallel about the set-up switch 710 (which is only momentarily closed), closes the normally open (positive contact insuring) contacts 760 in parallel with the detecting head contacts and also closes the normally open set-up contacts 760 in the memory circuit 702. Shortly thereafter the normally open cam operated switch 762 in the memory circuit 702 is closed momentarily to complete a circuit comprising the conductor 724, the now closed set-up contacts 761 of the relay 716, the now closed cam operated switch 762, the coil 764 of the relay 766 and the normally closed mercury switch 252 and the conductor 152. Energization of the coil 764 of the relay 766 in the memory circuit 702 closes the normally open holding contacts 768, opens the normally closed contacts 774 of the relay 766 and closes the normally open contacts 770 of the relay 766 for actuating the "removal" coil 772.

A closed circuit now exists comprising the conductor 724, the now closed contacts 770 of the relay 766 and the "removal" coil 772 of the air valve 773, the conductor 790 and the 110 volt conductor 152 thus energizing said coil 772. Energization of the "removal" coil 772 causes the valve 773 to move the operating rod 210 of the air cylinder 212 upwardly and remove the lead wire (either 20 or 21) from a head 16 at station "3." It will be understood that the time lag between operation of the detecting circuit 700 and the activation of the "removal" coil 772 in the memory circuit 702 is sufficient to permit the indexing of the head 16 from station "2" to station "3."

As hereinbefore mentioned, during the removal of either lead wire 20 or 21 by the lead wire removal device 22, the mercury switch reversing block 216 thereof trips the trip lever 242 to actuate the lead wire disposal chute unit 230 (as hereinbefore explained) and also opens the mercury switch 252. Opening of the switch 252 deenergizes the coil 764 of the relay 766 thus opening the holding contacts 768 of the relay 766, and the normally open contacts 770 of the relay 766 for the "removal" coil 772 and permitting the normally closed contacts 774 of the relay 766 for the "return" coil 775 to close.

A closed circuit again exists comprising the conductor 724, the now closed contacts 774 of the relay 766, the "down" coil 775 of the air valve 773, the conductor 790 and 110 volt supply conductor 152. The operating rod 210 of the air cylinder 212 is actuated downwardly, as hereinbefore explained, to reclose the mercury switch 252 on the trip lever 242 and return the lead wire removal unit 22 to its lower rest position shown in Fig. 7.

To return the detecting circuit 700 to its normal condition immediately prior to the next detecting operation at station "2" the cam operated normally closed switch 708 is opened just instantaneously prior to the closing of the normally open cam operated set-up switch 710 on the next cycle of operation, to deenergize the coil 714 and reset the detecting circuit 700 for said next cycle of operation.

Circuit for lead wire detector at station "9" and bead feeding device at station "10"

The circuit for the lead wire detector at station "9" and the bead feeding device 40 at station "10," similar in structure and operation to the circuit for the lead wire detector 19 at station "2" and the lead wire removal device 22 at station "3" comprises a detecting circuit 800 and a memory circuit 802 of Fig. 24.

Detecting circuit

It will be understood that the detecting circuit 800 of Fig. 24 is identical to the detecting circuit 700 of Fig. 9 except that in the case of the detecting circuit 800 the relay 714 (has in addition to the normally open set-up contacts 760 and the normally open holding contacts 734) a pair of normally open set up contacts 830 for energizing a signal relay 834 and a pair of normally closed contacts 822 for deenergizing a bead feeding solenoid coil 828. In addition the lead wire detecting head 340 of the lead wire detector 30 at station "9" is substituted for the lead wire detecting head 122 of the lead wire detecting device at station "2."

In particular referring to Fig. 24, the hereinbefore mentioned supply line or conductor 360 extends from the junction point 750 with the conductors 758 and 746 to the lugs 362 (not shown in Fig. 24) from which the flexible lines 364 and 366 lead directly to the movable contacts 348 and 349. The hereinbefore mentioned conductor 370 extends from a junction point 804 with the 110 volt supply line 152 to a junction point from which conductors extend respectively to the stationary contacts 346 and 347.

Memory circuit

The memory circuit 802 comprises essentially a manually operated switch 820 in series with normally closed deenergizing contacts 822 of the relay 714 in the detecting circuit 800, a cam operated normally open bead feeding switch 826 and a solenoid coil 828 of the escapement mechanism solenoid 432. In addition, the normally open set up contacts 830 of the relay 714 are in series with a coil 832 of a signal operating relay 834. Both the contacts 830 and 832 are themselves in parallel with the above mentioned series circuit.

This memory circuit 802 is accomplished by a conductor 840 extending from a junction point 841 with the conductor 720 in the detecting circuit 800 to a normally open contact 842 of the manually operated switch 820. A second conductor 843 connects the junction point 722 with the conductors 720 and 723 in the detecting circuit 800 to a normally closed contact 844 of the manually operated switch 820. A conductor 845 interconnects in succession a common contact 846 of the manually operated switch 820, a junction point 847, the normally closed contacts 822 of the relay 714, the normally open cam operated switch 826 of the escapement mechanism solenoid 432 to a junction point with the 110 volt supply line 152. From the junction point 847 with the line 845, a conductor 850 connects the normally open set up contacts 830 of the relay 714, successive junction points 851 and 852 and the coil 832 of the signal relay 834 to a junction point 853 with the 110 volt supply line 152.

From the junction point 851 with the line 850, a conductor 856 extends through a red signal lamp 858 to a junction point 859 with the 110 volt supply line 152. A conductor 860 extends from the junction point 852 with the line 850 through a pair of normally open set up contacts 862 of the signal relay 834 and a primary 863 of a transformer 864 to a junction point 865 with the line 152. A 10 volt secondary 866 of the transformer 864 may be suitably connected to a bell 870 by means of a conductor 872.

*Operation of circuit for lead wire detector and bead feeder at station "10"*

As previously explained in the case of the lead wire detector 19 at station "2," if both the short lead wire 20 and the long lead wire 21 are in a head 16 at station "9" both pairs of contacts of the detecting head 340 of the lead wire detector 30 at station "9," namely, movable contact 348 and stationary contact 346 and movable contact 349 and stationary contact 347, will be opened and the detecting circuit 800 will not operate. However, a complete circuit exists through the switch 820, normally closed contacts 822 of the relay 714, and the solenoid coil 828 of the escapement mechanism solenoid 432 when the cam operated normally open switch 826 is closed. The switch 826 is closed at the time when the above mentioned head 16 is at station "10." Energization of the coil 828 of the escapement mechanism solenoid 432 causes the escapement mechanism 430 to move into the position shown in Fig. 14, and permit the delivery of a bead 45 to the bead receiving chamber 503 of the bead turning mechanism 470.

If either or both of the lead wires 20 and 21 are missing from a head 16 at station "10," the detecting circuit 800 is closed at a predetermined time as controlled by the normally open set-up switch 710. The coil 712 of the relay 714 is then energized. Energization of the coil 712 opens the normally closed contacts 822 of the relay 714 in the memory circuit 802, thus preventing the energization of the solenoid coil 828 by the cam operated switch 826. Simultaneously the normally open set up contacts 830 of the relay 714 in the memory circuit 802 are closed and the coil 832 of the signal circuit operating relay 834 is energized. A closed circuit exists through the switch 820, the now closed contacts 830 and the coil 832 of the relay 834. The colored signal lamp 858 is like-wise energized and the normally open contacts 862 of the relay 834 are closed. Simultaneous with the closing of the contacts 862 the transformer 864 becomes energized and a bell 870 sounds an audible warning to the operator of the machine 10 of the condition at station "9."

Although a preferred embodiment of the automatic mount making machine for projector lamps, the lead wire detector and lead wire removal device at stations "2" and "3" respectively and the lead wire detector, bead feeding device and bead push-down device at stations "9," "10" and "11" respectively have been disclosed, it will be understood that modifications may be made within the spirit and scope of the invention.

We claim:

1. A device for detecting the absence of one or more lead wires in a head of an automatic mount-making machine for projector lamps, comprising support means, a push-rod reciprocable in said support means, a lead-wire detecting head on said push-rod and means on said support means for reciprocating said push-rod and moving said detecting head into and out of engagement with said lead wires, said detecting head having a body on said push-rod, a stationary lower contact block on said body and carrying thereon a pair of stationary lower contacts, and a pair of movable contact arms pivotable on said body and each carrying a movable contact normally in engagement with an associated stationary contact.

2. A device for detecting the absence of one or more lead wires in a head of an automatic mount-making machine for projector lamps, comprising a support casting, a push-rod reciprocable in said casting, a lead-wire detecting head on said push-rod and means on said casting for reciprocating said push-rod and moving said detecting head into and out of engagement with said lead wires, said detecting head having a body on said push-rod, a stationary lower contact block on said body and carrying thereon a pair of stationary lower contacts, and a pair of movable contact arms pivotable on said body and each carrying a movable contact thereon normally in engagement with an associated stationary contact, each of the associated pairs of movable and stationary contacts being adapted during movement of the detecting head to be opened by the presence of a lead wire.

3. A device for removing a lead wire from a head of an automatic mount-making machine for projector lamps, comprising support means, a jaw-opening-and-closing cam track on said support means, a slide reciprocable within said support means, a pair of scissor-like jaw arms pivoted on the lower portion of said slide and normally in the open position about a lead wire which is to be removed from said head, means on the upper portions of each of said jaw arms for engaging said cam track, means on said support means for moving said slide with respect to said cam track and causing said jaw arms to close about said lead wire to move upwardly and thereby remove the lead wire from said head and then open to release said removed wire, a block connecting said slide to said means for reciprocating said slide, and a lead-wire disposal chute assembly on said casting and operable by movement of said block to move into lead-wire receiving position during the upward movement of said jaw arms but prior to the release of said removed lead wire.

4. A device for removing a lead wire from a head of an automatic mount-making machine for projector lamps, comprising a support casting, a support member on said casting, a jaw-opening-and-closing cam track on said support member, a slide bracket on said casting, a slide reciprocable within said slide bracket, a pair of scissor-like jaw arms pivoted on the lower portion of said slide and normally in the open position about a lead wire which is to be removed from said head, means on the upper portions of each of said jaw arms for engaging said cam track, means on said casting for moving said slide with respect to said cam track and causing said jaw arms to close about said lead wire, to move upwardly and thereby remove the lead wire from said head and then open to release said removed wire, a reversing block connecting said slide to said means for reciprocating said slide, and a lead-wire disposal chute assembly on said casting and operable by movement of said reversing block to move into lead-wire receiving position during the upward movement of said jaw arms but prior to the release of said removed lead wire.

5. A device for removing a lead wire from a head of an automatic mount-making machine for projector lamps, comprising support means, a jaw-opening-and-closing cam track on said support means, a slide reciprocable within said support means, a pair of scissor-like jaw arms pivoted on the lower portion of said slide and normally in the open position about a lead wire which is to be removed from said head, means on the upper portions of each of said jaw arms for engaging said cam track, means on said support means for reciprocating said slide and causing said jaw arms to close about said lead wire, to move upwardly and thereby remove the lead wire from said head and then open to release said removed wire, a reversing block connecting said slide to said means for reciprocating said slide, a lead-wire disposal chute assembly on said casting and operable by movement of said reversing block to move into lead-wire receiving position during the upward movement of said jaw arms but prior to the release of said removed lead wire, means associated with said means for reciprocating said slide for reversing the direction of movement of said latter means, and electrical means carried by said disposal chute assembly and operable by movement of said disposal chute assembly into lead-wire receiving position to actuate said means for reversing the direction of movement.

6. The combination with an automatic mount-making machine for projector lamps of a lead-wire detecting circuit comprising in series a normally-closed reset switch, a normally open detecting circuit set-up switch and a coil of a detecting circuit relay connected to the plate of a thyratron electronic switch, said thyratron electronic switch being provided with a voltage supply for the cathode and having a grid negatively biased with respect to said cathode, and a pair of movable and stationary contacts of a detecting head connected to said grid and to a source of voltage which is capable of firing said thyratron electronic switch, said detecting-circuit relay having a pair of normally-open holding contacts in parallel with said set-up switch, a second pair of normally-open contacts in parallel with the contacts of said detecting head and a pair of normally-open set-up contacts, and a memory circuit for deactivating a lead-wire removal device, said memory circuit being energizable by closure of said set-up contacts.

7. The combination with an automatic mount-making machine for projector lamps of a lead-wire detecting circuit comprising in series a normally-closed reset switch, a normally-open detecting circuit set-up switch and a coil of a detecting-circuit relay connected to the plate of a thyratron electronic switch, said thyratron electronic switch being provided with a voltage supply for the cathode and having a grid negatively biased with respect to said cathode, and a pair of movable and stationary contacts of a detecting head connected to said grid and to a source of voltage which is capable of firing said thyratron electronic switch, said detecting-circuit relay having a pair of normally-open holding contacts in parallel with said set-up switch, a second pair of normally-open contacts in parallel with the contacts of said detecting head and a pair of normally-open set-up contacts, and a memory circuit for deactivating a lead-wire removal device comprising in series said normally-open set-up contacts of said detecting-circuit relay, a normally-open memory circuit set-up switch, a coil of a memory-circuit relay and a normally-closed mercury switch, said memory-circuit relay having one pair of normally-open holding contacts in parallel with said set-up contacts of said detecting-circuit relay and said memory-circuit set-up switch, a second pair of normally-open contacts when closed in series with a first operating coil for a two-way air valve and both in parallel with said memory circuit, and a pair of normally-closed contacts in series with a second operating coil of said valve and both in parallel with said memory circuit.

8. An automatic mount-making machine for projector lamps, comprising a table, a conveyor chain on the periphery of said table, a plurality of heads carried by said conveyor chain and adapted to receive a predetermined number of lead wires and to be indexed through a plurality of work stations on said table, a lead-wire detecting device on said table at one work station for detecting the absence of a lead wire in said heads, said lead-wire detecting device comprising support means on said table, a push-rod reciprocable in said support means, a lead-wire detecting head on said push-rod, and means on said support means for reciprocating said push-rod and moving said detecting head into and out of engagement with said lead wires, said detecting head having a body on said push-rod, a stationary lower contact block on said body and carrying thereon a pair of stationary lower contacts, and a pair of movable contact arms pivotable on said body and each carrying a movable contact thereon in normally-closed engagement with an associated stationary contact, each of the associated pairs of movable and stationary contacts being adapted during reciprocation of the detecting head to be opened by the presence of a lead wire, and a normally activated lead-wire removal device on said table at a second work station and operatively associated with said detecting device, said removal device being deactivated by said detecting device when the predetermined number of lead wires is present in said head.

9. An automatic mount-making machine for projector lamps, comprising a table, a conveyor chain on the periphery of said table, a plurality of heads carried by said conveyor chain and adapted to receive a predetermined number of lead wires and to be indexed through a plurality of work stations on said table, a lead-wire detecting device on said table at one work station for detecting the absence of a lead wire in said heads, and a normally activated lead-wire removal device on said table at a second work station and operatively associated with said detecting device to be deactivated thereby when the predetermined number of lead wires is present in said heads, said removal device comprising support means, a jaw-opening-and-closing cam track on said support means, a slide reciprocable within said support means, a pair of scissor-like jaw arms pivoted on the lower portion of said slide and normally in the open position about said lead wires, means on the upper portions of each of said jaw arms for engaging said cam track, means on said support means for moving said slide with respect to said cam track and causing said jaw arms to close about said lead wires to move upwardly and thereby remove the lead wires from said head and then open to release said removed wires.

10. An automatic mount-making machine for projector lamps, comprising a table, a conveyor chain on the periphery of said table, a plurality of heads carried by said conveyor chain and adapted to receive a predetermined number of lead wires and to be indexed through a plurality of work stations on said table, a lead-wire detector on said table at one work station for detecting the absence of a lead wire in said heads, a normally activated lead-wire removal device on said table at a second work station and operatively associated with said detecting device to be deactivated thereby when the predetermined number of lead wires is present in said head, said removal device comprising support means, a jaw-opening-and-closing cam track on said support means, a slide reciprocable within said support means, a pair of scissor-like jaw arms pivoted on the lower portion of said slide and normally in the open position about said lead wires, means on the upper portions of each of said jaw arms for engaging said cam track, means on said support means for moving said slide with respect to said cam track and causing said jaw arms to close about said lead wires, to move upwardly and thereby remove the lead wires from said head and then open to release said removed wires and a reversing block connecting said slide to said means for reciprocating said slide; and a lead-wire disposal chute assembly on said support means and operable by movement of said reversing block to move into lead-wire receiving position during the upward movement of said jaw arms but prior to the release of said removed lead wires.

11. An automatic mount-making machine for projector lamps, comprising a table, a conveyor chain on the periphery of said table, a plurality of heads carried by said conveyor chain and adapted to receive a predetermined number of lead wires and to be indexed through a plurality of work stations on said table, a lead-wire detecting device on said table at one work station for detecting the absence of a lead wire in said heads, an electrical lead-wire detecting circuit operatively associated with said lead-wire detecting device and adapted to remain energized when one or more lead wires are missing from said heads, a normally activated lead-wire removal device on said table at a second work station, and an electrical memory circuit operatively associated with said lead-wire removal device and energizable by said lead-wire detecting circuit when a lead wire is missing from said heads to thereby activate said lead-wire removal device and cause the removal of the remaining lead wires from said heads.

12. An automatic mount-making machine for projector lamps comprising a table, a conveyor chain on the periphery of said table, a plurality of heads carried by said conveyor chain and adapted to receive a predetermined number of lead wires and to be indexed through a plurality of work stations on said table, a lead-wire detecting device on said table at one work station and having a predetermined number of pairs of normally-closed detecting contacts, each pair of which is opened by engagement with an associated lead wire in said heads, an electrical lead-wire detecting circuit operatively associated with said lead-wire detecting device and adapted to remain energized when one or more lead wires are missing from said heads, said lead-wire detecting circuit comprising in series a normally-closed reset switch, a normally-open detecting circuit set-up switch and a coil of a detecting-circuit relay connected to the plate of a thyratron electronic switch, said thyratron electronic switch being provided with a voltage supply for the cathode and having a grid negatively biased with respect to said cathode, said pairs of contacts being connected to said grid and to a source of voltage which is capable of firing said thyratron electronic switch, said detecting-circuit relay having a pair of normally-open holding contacts in parallel with said set-up switch, a second pair of normally-open contacts in parallel with said detecting contacts and a third pair of normally-open set-up contacts, a normally activated lead-wire removal device on said table at a second work station, and an electrical memory circuit operatively associated with said lead-wire removal device and energizable by closure of said set-up contacts in said lead-wire detecting circuit to thereby activate said lead-wire removal device and cause the removal of the remaining lead wires from said heads.

13. An automatic mount-making machine for projector lamps, comprising a table, a conveyor chain on the periphery of said table, a plurality of heads carried by said conveyor chain and adapted to receive a predetermined number of lead wires and indexable through a plurality of work stations on said table, a lead-wire detector on said table at one work station and having a predetermined number of pairs of normally-closed detecting contacts, each pair of which is opened by engagement with an associated lead wire in said heads, an electrical lead-wire detecting circuit operatively associated with said lead-wire detecting device and adapted to remain energized when one or more lead wires are missing from said heads, said lead-wire detecting circuit comprising in series a normally-closed reset switch, a normally-open detecting circuit set-up switch and a coil of a detecting-circuit relay connected to the plate of a thyratron electronic switch, said thyratron electronic switch being provided with a voltage supply for the cathode and having a grid negatively biased with respect to said cathode, said pairs of detecting contacts being connected to said grid and to a source of voltage which is capable of firing said thyratron electronic switch, said detecting-circuit relay having a pair of normally-open holding contacts in parallel with said set-up switch, a second pair of normally-open contacts in parallel with said detecting head contacts and a third pair of normally-open set-up contacts, a normally-activated lead wire removal device on said table at a second work station, and an electrical memory circuit operatively associated with said lead-wire removal device and energizable by closure of said set-up contacts in said lead-wire detecting circuit to thereby activate said lead-wire removal device and cause the removal of the remaining lead wires from said heads, said memory circuit comprising in series said normally-open set-up contacts of said lead-wire detecting-circuit relay, a normally-open memory-circuit set-up switch, a second coil of a memory-circuit relay and a normally-closed mercury switch, said memory-circuit relay having one pair of normally-open holding contacts in parallel with said set-up contacts of said detecting-circuit relay and said memory-circuit set-up switch, a second pair of normally-open contacts when closed in series with an operating coil of a two-way air valve and both in parallel with said memory circuit, and a third pair of normally-closed contacts in series with a second operating coil of said valve and both in parallel with said memory circuit.

References Cited in the file of this patent

UNITED STATES PATENTS 2,653,711     Flaws _____ Sept. 29, 1953